United States Patent
Sakata et al.

(10) Patent No.: US 6,352,578 B1
(45) Date of Patent: Mar. 5, 2002

(54) AIR CLEANING FILTER, PROCESS FOR PREPARING THE SAME, AND HIGH-LEVEL CLEANER

(75) Inventors: Soichiro Sakata; Katsumi Sato; Hideto Takahashi, all of Kanagawa-ken; Takao Okada, Tokyo, all of (JP)

(73) Assignee: Takasago Thermal Engineering Co., Ltd., Tokyo (JP)

( * ) Notice: Subject to any disclaimer, the term of this patent is extended or adjusted under 35 U.S.C. 154(b) by 0 days.

(21) Appl. No.: 09/463,556

(22) PCT Filed: Sep. 22, 1998

(86) PCT No.: PCT/JP98/04262

§ 371 Date: Jan. 24, 2000

§ 102(e) Date: Jan. 24, 2000

(87) PCT Pub. No.: WO99/61134

PCT Pub. Date: Feb. 12, 1999

(30) Foreign Application Priority Data

May 26, 1998 (JP) .......................................... 10-143855

(51) Int. Cl.⁷ ............................................... B01D 53/04
(52) U.S. Cl. ..................... 96/134; 96/154; 55/385.2; 55/514; 55/521; 55/524; 55/DIG. 5
(58) Field of Search ..................... 96/108, 125, 150, 96/153, 154, 134, 135; 55/385.1, 385.2, 514, 516, 521, 524, DIG. 5

(56) References Cited

U.S. PATENT DOCUMENTS 2,038,071 A * 4/1936 Wilhelm ................... 96/153 X
5,435,958 A * 7/1995 Dinnage et al. .......... 96/154 X
5,512,083 A * 4/1996 Dunne ....................... 96/154 X
5,580,370 A * 12/1996 Kuma et al. ................... 96/154
5,607,647 A * 3/1997 Kinkead .................... 55/524 X
5,667,560 A * 9/1997 Dunne ....................... 96/154 X
6,120,584 A * 9/2000 Sakata et al. ............. 96/154 X
6,146,451 A * 11/2000 Sakata et al. ............. 96/154 X

FOREIGN PATENT DOCUMENTS

| JP | 57-056019 | * 4/1982 | ................... 96/153 |
| JP | 60-000827 | * 1/1985 | |
| JP | 63-310636 | * 12/1988 | |
| JP | 02-009406 | * 1/1990 | |
| JP | 02-048015 | * 2/1990 | ................... 96/154 |
| JP | 03-068415 | * 3/1991 | ................... 96/154 |
| JP | 04-104835 | * 4/1992 | |
| JP | 04-079999 | * 7/1992 | |
| JP | 05-023529 | * 2/1993 | ................... 96/154 |
| JP | 05-161841 | * 6/1993 | |

* cited by examiner

*Primary Examiner*—Robert H. Spitzer
(74) *Attorney, Agent, or Firm*—Patterson, Belknap, Webb & Tyler LLP

(57) ABSTRACT

The present invention relates to an air filter having an inorganic material layer in which the following adsorbent is fixed on the surface of the supporter using powder of an inorganic substance as a binder. That is, the adsorbent is prepared by impregnating a salt of an inorganic acid to powder of an inorganic substance consisting of at least one of diatom earth, silica, alumina, a mixture of silica and alumina, aluminum silicate, activated alumina, porous glass, activated clay, activated bentonite, or synthetic zeolite. The air filter according to the present invention can adsorb and remove both of gaseous basic impurities and gaseous organic impurities, thus making a very effective filter for manufacturing semiconductor and LCD.

26 Claims, 18 Drawing Sheets

AIR CLEANING FILTER, PROCESS FOR PREPARING THE SAME, AND HIGH-LEVEL CLEANER

TECHNICAL FIELD

The present invention relates to an air filter used in a high efficiency air cleaning apparatus, such as a clean room, a clean bench, a storage means (stocker), etc., for removing gaseous inorganic and/or organic impurities contained in the atmosphere in the high efficiency air cleaning apparatus. The invention also relates to a method for manufacturing the air filter and further relates to the high efficiency air cleaning apparatus, the device or the like provided with the filter manufactured according to the method.

BACKGROUND ATR

In these days, when semiconductors and LCD panels are manufactured, a high efficiency air cleaning apparatus is generally used. For instance, the production line for a semiconductor from a bare wafer to 1 megabyte DRAM chip, includes about 200 steps, and the production line to produce 9.4-inch TFT type LCD panel from solid glass includes about 80 steps. In these production lines, it is difficult to transfer wafers and glass substrates consecutively and continuously to next process. For instance, in the TFT-LCD production line, it is not rare to see half finished products, on which a predetermined circuit is already formed, forced to be kept inside of a carrier or a stocker, while being exposed to the inside atmosphere for several to several tens of hours until they are transferred to the next manufacturing step.

As stated above, when a semiconductor substrate or a LCD substrate is kept in an atmosphere of an ordinary clean room for a long time, gaseous impurities contained in the room would be deposited on the surface thereof. Recently, acid substances, basic substances, organic substances and various dopants are considered to exist in such clean room in a gaseous state and these substances give an ill influence to the performance of semiconductors or LCD panels when they are deposited on the silicon wafer surface used for semiconductor production, or on the glass substrate surface used for the LCD panel production.

According to an article titled "Forecast of Airborne Molecular Contamination Limits for the 0.25 Micron High Performance Logic Process" of Technology Transfer #95052812A-TR publicized by SEMATECH on May 31, 1995, these acid substances, basic substances, organic substances and dopants are called chemical contaminants and respectively defined as follows.

"acid substance": a corrosive substance to react chemically like an electron acceptor. (hydrofluoric acid HF, sulfur oxides SOx, nitrogen oxides NOx, etc.).

"basic substance": a corrosive substance to behave chemically like an electron donor. (ammonia $NH_3$, amine, etc.).

"organic substance": a substance having a boiling point higher than normal temperature under normal pressure, condensing on a cleaned surface. (siloxane, phthalate, HMDS, BHT, etc.).

"dopant": chemical element to give ill influence to an electrical performance of the semiconductor device. (Boron B, phosphorus P).

Table 1 is a list of the allowable concentration (ppt) of the chemical contaminants required for 0.25 $\mu$process (after '98), which is disclosed in the article entitled "Forecast of Airborne Molecular Contamination Limits for the 0.25 Micron High Performance Logic Process" of Technology Transfer #95052812A-TR published by SEMATECH (U. S. A) on May 31, 1995. The value in percentage shown in the bottom of the allowable concentration (ppt) shows the reliability of each allowable concentration value. The table shows the allowable concentration of the chemical contaminants in clean space of four semiconductor production processes having serious chemical contamination problems. According to one example of the actual measurement of various contaminants contained in the atmosphere of the ordinary clean room not provided with any chemical protective measure against gaseous contaminants, it is reported that acid substances of about 100 ppt–1,000 ppt, basic substances of about 1,000 ppt–10,000 ppt, organic substances of about 1,000 ppt–10,000 ppt, and dopants of about 10 ppt–100 ppt, respectively are contained in such atmosphere.

TABLE 1

| Process | Max. standby hour | Acidic substance | Basic substance | Organic substance | Dopant |
|---|---|---|---|---|---|
| Pre-gate oxidation | 4 | 13,000 50% | 13,000 50% | 1,000 75% | 0.1 90% |
| Salicidation | 1 | 180 50% | 13,000 25% | 35,000 75% | 1,000 75% |
| Contact formation | 24 | 5 50% | 13,000 25% | 2,000 75% | 100,000 75% |
| Photolithography | 2 | 10,000 75% | 1,000 90% | 100,000 50% | 10,000 50% |

When concentration of the chemical contaminants in the atmosphere of the ordinary clean room not provided with any chemical protective measure against gaseous contaminants, and the allowable concentration of the chemical contaminants in Table 1 are compared, it is found that severe controls are required for the processes stressed by underlines under the numerals of the allowable concentrations (ppt). That is to say, with regard to acid substances, they should be controlled to less than 180 ppt in the salicidation process, and less than 5 ppt in the contact formation process. As for basic substances, they should be controlled to less than 1 ppb, in the photolithographic process. With respect to the dopant, it should be controlled to less than 0.1 ppt for the pre-gate oxidation process. As to organic substances, they should be controlled to less than 1 ppb in the pre-gate oxidation process, and less than 2 ppb in the contact formation process.

Such impurities as gaseous acid substance, basic substance, organic substance, and dopant shown in Table 1, cause problems if contained in various high efficiency air cleaning apparatus for production of semiconductor substrate and glass substrate, such as clean room, cleanbench and clean chamber, various scale of high efficiency air cleaning apparatus such as stocker for keeping clean products, and local high efficiency air cleaning apparatus called mini environment.

Among them, dopant shows a chemical behavior resembling acid substance as water-soluble borate compound or phosphorous compound, and a filter having a capability to adsorb and remove gaseous acid substance can adsorb and remove the dopant. As apparent from Table 1, simultaneous removal of organic substance and dopant in the pre-gate oxidation process, and simultaneous removal of acid substance and organic substance are required respectively.

Though not mentioned in Table 1, gaseous contaminants generated in the photolithography process are HMDS (hexamethyl disilazane) and its decomposition product besides ammonia. HMDS is a lipophilic substance to coat on a wafer to improve affinity of a litho-film to a silicon wafer and very easy to adhere to a surface (wafer, lens, glass etc.). HMDS is hydrolyzed in a few days to gasify into ammonia and trimethyl silanol. When trimethyl silanol adheres to a lens or mirror thereby making the surface thereof blur, it causes an exposure trouble during the exposure process. KrF laser exposure (248 nm) is used in a device having 0.25 $\mu$m in line width, and the KrF laser exposure is considered to be still used in a gigabyte-capable device having 0.18 $\mu$m in line width which is expected to start mass production from the year of around 2000.

The clouding of lens by HMDS or trimethyl silanol gives a fatal effect. Both HMDS and trimethyl silanol are organic substances with no ionization and did not draw much attention at the time of 1997. In a photolithography process for manufacturing the gigabyte-capable device having 0.18 $\mu$m in line width, however, simultaneous removal of base and organic substance is necessary.

Of the four chemical contaminants, three kinds of contaminants, an acid substance, a basic substance, and dopant, are soluble and they are apt to give rise to ion-exchange reaction and neutralization reaction. As a means for removing these three kinds of chemical contaminants from the air in a clean space, there has been a method for removing them by dissolving into aqueous solution using a wet rinsing (scrubber rinsing) and a chemical adsorption method using so-called chemical filter such as ion-exchange fiber and a chemical impregnated activated charcoal. On the other hand, among four kinds of chemical contaminants, majority of organic substances, do not dissolve in water and a physical adsorption method using activated charcoal has been used to remove them from the air in a clean space.

Gaseous inorganic impurities of acid substance, basic substance and dopant have been removed hitherto by three methods, wet type rinsing, ion-exchanging, and chemical impregnated activated charcoal, as described above.

The wet type rinsing is a method to dissolve and remove the acid substances, basic substances, and dopants by spraying droplets.

A cylindrical case in which particulate activated charcoal impregnated with chemicals is filled up in a designated case is known as the most simple configuration of a chemical filter using activated charcoal impregnated with chemical. Chemical filters of other types are also known. For instance, one type of chemical filters are made in the form of a felt by interweaving chemical-impregnated fibrous activated charcoal with an organic binder of low melting point polyester or polyester non-woven fabric, and the other type of chemical filters are formed in the shape of a block or a sheet by firmly binding particulate activated charcoal impregnated with chemicals to an air permeable urethane foam or a non-woven fabric with a proper adhesive. These chemical filters adsorb and remove gaseous acid substances and gaseous basic substances by neutralization reaction with the impregnating chemicals.

A chemical filter using an ion exchange fiber performs ion-exchange and removal of various ions, that is, acid and/or basic impurities contained in the air with a filter made of an acid cation exchange fiber and a basic anion exchange fiber in the form of a non-woven fabic, a sheet, or a felt as its basic filter media.

However, in the case of the wet type air rinsing system, an atomizer requires a rather large amount of initial cost for installation thereof and it also requires a considerable amount of running cost for the high pressure loss of spraying, which can not be overlooked. Furthermore, a clean room used for the production of a semiconductor element (LSI) or LCD, is kept at 23° C. to 25° C. with relative humidity of 40% to 55%. Accordingly, when the air in the clean room is circulated during wet rinsing, it becomes necessary to adjust again the temperature and humidity in the air after spraying to manage the temperature drop and the humidity increase after spraying. In addition, a means to remove droplets remained in the air after spraying is required in the downstream side of the atomizer. (the so-called carry-over issue). Furthermore, there arises problems peculiar to water treatment, such as treatment of washing water used circulatedly in the atomizer, preventing bacteria from being generated and/or condensing and separating dissolved contaminants.

The so-called chemical filter, utilizing chemical-impregnated activated charcoal and ion-exchange fiber, has the following disadvantages. First, the disadvantage, common to both types of chemical filters, can be cited. For instance, as for a clean room in which the ceiling is served as an air outlet of the clean air, it is extremely effective for removal of gaseous impurities in the air atmosphere in the clean room to install the chemical filter in the upstream side of the particulate filter installed on the ceiling. However, activated charcoal is a flammable substance specified by the Fire Service Act and the ion-exchange fiber is made of very ignitable material, which requires intensive caution for fire. Accordingly, it is difficult, from a viewpoint of disaster prevention, to install a chemical filter using the activated charcoal or the ion-exchange fiber.

Furthermore, a chemical filter using the chemical-impregnated activated charcoal has the following disadvantage. A conventional cylinder case type chemical filter has an advantage of high adsorption efficiency of impurities, but has a disadvantage of a high pressure loss (ventilation resistance). The conventional chemical filter in the form of a felt or a sheet has an excellent air permeability, and its adsorption efficiency is not so inferior compared to the cylinder case type. However, gaseous impurities desorbed from the constituents (for instance, non-woven fabric, organic binder, etc.), adhesives which fixes charcoal to the sheet (for instance, neoprene series resin, urethane series resin, epoxy series resin, silicon series resin, etc.), sealant to use for fixing filter materials to the surrounding frame (for instance, neoprene rubber, silicon rubber, etc.) are mixed with the air once cleaned by passing through the chemical filter and would give a negative influence to the manufacture of the semiconductor device.

It should be noted that, the chemical filter using chemical-impregnated activated charcoal in the form of a felt or a sheet removes very small quantity of acid or basic impurities on the order of ppb contained in the clean room, and dopant of ppt order, but it mixes gaseous organic impurities, which are desorbed from the chemical filter itself, into the air passing through. Many of these chemical filters have been originally developed to remove noxious gases or offensive odor in the residential environment, and are diverted into the chemical filter for the clean room. Consequently, its performance and specification are designed to meet the standard of the field of residential environment, and it is inadequate from the first place to apply it to the air filter use for removing very small quantity of gaseous inorganic impurities, which causes the contamination of the substrate surface during the production of the semiconductor device (LSI) or LCD.

A chemical filter using chemical-impregnated activated charcoal is disclosed, for instance, in the Japanese laid-open patent No. Sho 61-103518. This filter is made by immersing the base material made of urethane foam into aqueous solution containing powdered activated charcoal, emulsion type adhesive and solid acid, and being dried. However, in this chemical filter, the desorption of gaseous organic substances occurs from synthetic rubber latex type and other water-dispersion type organic adhesive as an emulsion type adhesive, and from the base material of the urethane foam itself.

On the other hand, the so-called chemical filter utilizing the ion-exchange fiber has a following disadvantage. Gaseous organic impurities, generated from the binder and adhesive used for processing ion-exchange fiber based non-woven fabric, paper, felt into filter material having excellent permeability, and generated from the sealant used for fixing the filter material to the surrounding frame, are mixed with the air once cleaned by passing through the chemical filter and would give a negative influence to the manufacture of semiconductor device. Still other disadvantage is the generation of dust from the filter material.

In Japanese Patent Laid-open No. Hei 6-63333 and in Japanese Patent Laid-open No. Hei 6-142439, a so-called chemical filter using an ion-exchange fiber is disclosed.

In the former so-called chemical filter used for an air cleaning system utilizing ion-exchange fiber, the material of the chemical filter is structured by mixing cation-exchange fiber which is polyacrylonitrile series fiber having carboxylic group or anion-exchange. fiber which is vinylon series fiber having quaternary ammonium group, with glass fiber and heat adhesive fibrous binder. Accordingly, the desorption of gaseous organic substances occurs from various additives contained in the constituent polymer fiber, or a part of the ion-exchange group may desorb as carboxylic acid or ammonia.

Furthermore, in the latter so-called chemical filter used for cleaning up a very small quantity of contaminated air in a clean room, utilizing ion-exchange fiber, the ion-exchange fiber made by introducing sulfonic group, carboxylic group or phosphoric group as a cation-exchange group into non-woven fabric of polyethylene or polypropylene, or made by introducing strong basic quaternary ammonium group or weak basic group containing lower amine is utilized. Accordingly, the desorption of gaseous organic substances occurs from various additives contained in the constituent polymer non-woven fabric, or a part of the ion-exchange group may desorb as sulfonic acid, carboxylic acid, phosphoric acid, ammonia, or amine.

Furthermore, when the air, for instance, in the photolithography process, which contains basic impurities such as ammonia, and gaseous organic impurities such as HMDS or trimethyl silanole at the same time, is treated, there exists complexity in such that the adsorptive material for removing basic impurities and the adsorptive material for removing organic impurities are separately prepared to make one adsorptive layer by mixing these two kinds of the adsorptive materials for the use, or the adsorptive layer for removing basic impurities and the adsorptive layer for removing organic impurities are made separately from two kinds of the adsorptive materials and are overlapped for the use.

If atmosphere in a clean room where four processes in Table 1 are performed, is mixed without being separated, as in the case when a plurality of processes are carried out in a big clean room, there arises a following disadvantage. For instance, in a process sensitive to inorganic impurities, if the gaseous impurities are removed by using the conventional chemical filter, the quality of the substrate is improved. This is because, in this process, the gaseous organic impurities generated from the chemical filter itself do not give negative influence to the quality of the substrate. However, in another process where the gaseous organic impurities are sensitive to organic impurities existing in the same room, surface contamination of the substrate is brought about, thereby causing the deterioration of the quality.

Therefore, in a big clean room where a plurality of processes are carried out, the chemical filter for the purpose of removing gaseous inorganic impurities is not only required to have superb property of removing these gaseous inorganic impurities, but also required not to generate gaseous organic impurities from the chemical filter itself. The development of a chemical filter which can remove at the same time both gaseous inorganic impurities and gaseous organic impurities, which cause the surface contamination of the substrate in the clean room atmosphere, has long been waited for.

In a case, as the photolithography process, where air containing both basic inorganic impurities and organic impurities is treated, hitherto, a chemical filter using activated charcoal for removing organic impurities was required in addition to a chemical filter for removing basic inorganic impurities. Accordingly, an improvement upon this point is also longed for.

Taking the above consideration into account, when a chemical filter is applied to a high efficiency air cleaning apparatus such as a clean room and a clean bench which can protect from acid contamination, basic contamination and organic substance contamination, the important issues are as follows.

The chemical filter itself should not be a contamination source of gaseous impurities and particulate impurities. (that is, not to be the secondary source of contamination)

The pressure loss of the chemical filter should be low.

The capability to remove gaseous impurities is high, and long-lived.

The conventional filter can not be said to satisfy these demands.

Accordingly, an object of the present invention is to provide an air filter which is safe and reliable from the standpoint of disaster prevention, does not desorb gaseous organic impurities and gaseous inorganic impurities from the filter itself, is able to remove not only gaseous basic impurities which cause problem particularly in the photolithography process but also gaseous organic impurities at the same time, and is able to prevent the substrate from surface contamination by gaseous basic impurities and gaseous organic impurities. Another object of the invention is to provide a method for manufacturing the filter as mentioned above. Still another object of the invention is to provide a high efficiency air cleaning apparatus equipped with the filter as mentioned above.

DISCLOSURE OF THE INVENTION

A filter to clean the air according to the present invention has an inorganic material layer, in which an adsorbent described below is fixed on the surface of a supporter using inorganic powder as a binder. The adsorbent is prepared by impregnating salt of an inorganic acid to powder of an inorganic substance that contains at least one of the following substances: diatom earth, silica, alumina, a mixture of silica and alumina, aluminum silicate, activated alumina, porous glass, activated clay, activated bentonite, or synthetic zeolite.

The air filter of the present invention has an inorganic material layer in which the adsorbent is fixed on the surface of the supporter using powder of the following inorganic substance α as a binder or a filler. The inorganic substance α consists of at least one of talc, kaolin mineral, bentonite, diatom earth, silica, alumina, a mixture of silica and alumina, aluminum silicate, activated alumina, porous glass, hydrated magnesium silicate clay mineral having a crystal structure of the ribbon type, activated clay, activated bentonite or synthetic zeolite.

"The filler" in this invention is an adsorbent and a component which constitutes an inorganic material layer. The filler fills up between particles of the adsorbent, but is arranged to keep air-permeable gaps or pores between the adsorbent. The inorganic substance α acts to fix the adsorbent to the supporter or fix among the particles of the adsorbent. However, the inorganic substance α does not have a capability to assure permanent adherence. Accordingly it becomes necessary to use an inorganic adhesion assisting agent such as silica sol or alumina sol in order to secure the adherence. Though the words "binder" and "filler" are used differently according to the degree of adherence in the adsorbent, the material itself is defined in the aforementioned list of the inorganic substance α.

In the air filter according to the present invention, a first inorganic material layer and a second inorganic material layer consisting of the following substance are stacked on the surface of a supporter in a manner that either one of the first inorganic material layer or the second inorganic material layer is directly fixed to the surface of the supporter. The first inorganic material layer is a layer formed of the adsorbent fixed by inorganic substances as a binder. The second inorganic material layer is a layer consisting of at least one of diatom earth, silica, alumina, a mixture of silica and alumina, aluminum silicate, activated alumina, porous glass, hydrated magnesium silicate clay mineral having a crystal structure of the ribbon type, activated clay, activated bentonite or synthetic zeolite.

In the air filter of the present invention, pellets of the adsorbent are fixed on the surface of the supporter, using powder of the inorganic substance α as a binder or a filler.

The air filter comprises the supporter, a first pellet and a second pellet, wherein the second pellet is formed around the following first pellet by coating with powder of the following inorganic substance β, and the second pellet is fixed on the surface of the supporter. The first pellet is prepared by pelletizing an adsorbent by using powder of an inorganic substance as a binder. The inorganic substance β is composed of at least one of diatom earth, silica, alumina, a mixture of silica and alumina, aluminum silicate, activated alumina, porous glass, hydrated magnesium silicate clay mineral having a crystal structure of the ribbon type, activated clay, activated bentonite or synthetic zeolite.

In the air filter according to the present invention, either a pellet which is formed by pelletizing the adsorbent using powder of the inorganic substance α as a binder or a filler, or a second pellet formed by coating with powder of the inorganic substance β around a first pellet which is formed by pelletizing the adsorbent using powder of an inorganic substance as a binder, is filled up in the casing.

In the air filter according to the present invention, the average pore diameter of the inorganic substance powder impregnated with salt of inorganic acid is 100 angstroms or more. In addition, sulfate is preferable as the salt of the inorganic acid. The supporter which has a honeycomb structure is preferred. The honeycomb structure is preferably made of inorganic fiber as an essential component.

A method for manufacturing the air filter has the following steps: immersing a supporter in a suspension in which the following adsorbent and powder of the following inorganic substance α are dispersed; and then drying the supporter, thereby forming the inorganic material layer fixed to the surface of the supporter. The adsorbent is prepared by impregnating salt of an inorganic acid to powder of an inorganic substance consisting of at least one of diatom earth, silica, alumina, a mixture of silica and alumina, aluminum silicate, activated alumina, porous glass, activated clay, activated bentonite, or synthetic zeolite; and the inorganic substance α is at least one of talc, kaolin mineral, bentonite, diatom earth, silica, alumina, a mixture of silica and alumina, aluminum silicate, activated alumina, porous glass, hydrated magnesium silicate clay mineral having a crystal structure of the ribbon type, activated clay, activated bentonite or synthetic zeolite.

A method for manufacturing the air filter according to the present invention comprises the steps of: immersing a supporter in a suspension in which the adsorbent and powder of an inorganic substance for the binder are dispersed; then drying the supporter, thereby forming a first inorganic material layer on the surface of the supporter; immersing the supporter on which the first inorganic material layer is formed in a suspension in which powder of the following inorganic substance β is dispersed; and then drying the supporter, thereby forming a second inorganic material layer on the surface of the first inorganic material layer, or forming the second its inorganic material layer on the surface of the supporter and then forming the first inorganic material layer on the second inorganic material layer. The inorganic substance β is at least one of diatom earth, silica, alumina, a mixture of silica and alumina, aluminum silicate, activated alumina, porous glass, hydrated magnesium silicate clay mineral having a crystal structure of the ribbon type, activated clay, activated bentonite or synthetic zeolite.

To the above method for manufacturing the air filter, a step of dissolving the salt of the inorganic acid in advance into the suspension separately before immersing the supporter, may be added.

A method for manufacturing the air filter according to the present invention comprises the steps of: preparing an adsorbent by impregnating salt of inorganic acid in advance to powder of the following inorganic substance γ; immersing a supporter in a suspension in which powder of the adsorbent and powder of the inorganic substance α as a binder are mixed together; and pulling up the supporter from the suspension for drying after immersing. The inorganic substance γ is at least one of diatom earth, silica, alumina, a mixture of silica and alumina, aluminum silicate, activated alumina, porous glass, activated clay, activated bentonite or synthetic zeolite. In this case, a step of dissolving the salt of the inorganic acid separately into the suspension may be added. This method is effective when salt of inorganic acid having a poor solubility in the suspension, that is, not easy to dissolve into the suspension, is used.

The method for manufacturing the air filter comprises the steps of immersing the supporter in a suspension in which powder of the inorganic substance γ and the inorganic substance α as a binder, are mixed together; pulling up the supporter from the suspension for drying after immersing in the suspension; immersing the dried supporter in a salt solution of inorganic acid; and pulling up the supporter from the solution for drying after immersing in the solution. This method is effective when salt of inorganic acid having a good solubility in the suspension, that is, easy to dissolve into the suspension, is used. In addition, since powder of the inorganic substance, that is, the inorganic adsorbent, is dried after fixing, the adsorber is in a good adsorptive state, so that the adsorbent with a large quantity of impregnated salt of the inorganic acid can be obtained. In the present invention, a holder of chemicals to which the salt of inorganic acid is impregnated is referred to as an adsorber, and an adsorber holding salt of inorganic acid is referred to as an adsorbent.

The method for manufacturing the air filter comprises the steps of: immersing the supporter in a suspension in which powder of the inorganic substance γ and the inorganic substance α as a binder are mixed in a salt solution of inorganic acid; and pulling up the supporter from the suspension for drying after immersing in the suspension. In this case, since the adsorber and the salt of the inorganic acid are not separately impregnated, the number of the steps in the process can be reduced.

In the method for manufacturing each air filter according to the present invention, sulfate may be used as salt of inorganic acid.

A high efficiency air cleaning apparatus according to the present invention comprises: an air circulating path which circulates air in a space where clean atmosphere is required; an air filter disposed in the air circulating path; and a filter for removal of particulate impurities, arranged on the upstream side of the space in the air circulating path and on the downstream side of the air filter, and the air filter includes an inorganic material layer in which the following adsorbent is fixed on the surface of the supporter using powder of inorganic substance as a binder. The adsorbent is prepared by impregnating salt of an inorganic acid to powder of an inorganic substance consisting of at least one of diatom earth, silica, alumina, a mixture of silica and alumina, aluminum silicate, activated alumina, porous glass, activated clay, activated bentonite, or synthetic zeolite. The air filter used in the high efficiency air cleaning apparatus according to the present invention may include an inorganic material layer in which the adsorbent is fixed on the surface of the supporter using powder of the following inorganic substance α as a binder or a filler. The inorganic substance α is at least one of talc, kaolin mineral, bentonite, diatom earth, silica, alumina, a mixture of silica and alumina, aluminum silicate, activated alumina, porous glass, hydrated magnesium silicate clay mineral having a crystal structure of the ribbon type, activated clay, activated bentonite or synthetic zeolite. The first inorganic material layer is a layer formed of the adsorbent using powder of an inorganic substance as a binder. The second inorganic substance layer is a layer consisting of at least one of diatom earth, silica, alumina, a mixture of silica and alumina, aluminum silicate, activated alumina, porous glass, hydrated magnesium silicate clay mineral having a crystal structure of the ribbon type, activated clay, activated bentonite or synthetic zeolite.

The air filter, used in the high efficiency air cleaning apparatus of the invention, may use a layer consisting of a first inorganic material layer and a second inorganic material layer stacked on the surface of the supporter in a manner that either one of the first inorganic material layer or the second inorganic material layer is directly fixed to the surface of the supporter and the remaining inorganic material. layer is additionally fixed to the surface of the first fixed inorganic material layer so that the first inorganic material layer and the second inorganic layer are stacked on the surface of the supporter. The first inorganic material layer is a layer formed of the adsorbent fixed by powder of an inorganic substance as a binder. The second inorganic material layer is a layer consisting of at least one of diatom earth, silica, alumina, a mixture of silica and alumina, aluminum silicate, activated alumina, porous glass, hydrated magnesium silicate clay mineral having a crystal structure of the ribbon type, activated clay, activated bentonite or synthetic zeolite.

The air filter used in the high efficiency air cleaning apparatus according to the present invention may comprise a supporter and a layer formed of a plurality of pellets fixed to the surface of the supporter, wherein the pellet is formed by pelletizing the adsorbent, using powder of the inorganic substancea as a binder or a filler. The air filter used in the high efficiency air cleaning apparatus according to the present invention, may comprise a supporter, a first pellet, and a second pellet, wherein the second pellet is formed around the following first pellet by coating with powder of the following inorganic substance β and the second pellet is fixed on the surface of the supporter. The first pellet is made by pelletizing the adsorbent using powder of an inorganic substance as a binder. The inorganic substance β consists of at least one of diatom earth, silica, alumina, a mixture of silica and alumina, aluminum silicate, activated alumina, porous glass, hydrated magnesium silicate clay mineral having a crystal structure of the ribbon type, activated clay, activated bentonite or synthetic zeolite.

The air filter used in the high efficiency air cleaning apparatus may be formed by filling in a case either one of the following two types of pellets: the first pellets are formed by pelletizing the adsorbent using powder of the inorganic substance α as a binder or a filler, and the second pellets formed by coating with powder of the inorganic substance β around the first pellets made by pelletizing the adsorbent using powder of the inorganic substance as a binder.

In each of the above described high efficiency air cleaning apparatus, the air filter and a filter for removal of particulate impurities may be installed onto the ceiling portion of said space or room.

In the filter according to the present invention, at a portion in the inorganic material layer, where powder of the adsorbent and particulates of powder of the inorganic binder are adjacent to each other, gaps which serves as air permeable pores are formed. The object gas comes inside of the inorganic material layer from the surface of the inorganic material layer, or comes out from the inside of the inorganic material layer to the outside, both passing through the permeable pores. Thus, when the object gas passes through the inside of the inorganic material layer, the basic impurities in the object gas are adsorbed and removed by the adsorbent.

The air filter according to the present invention, in which a salt of an inorganic acid is impregnated to an adsorber, is composed solely of inorganic substances, and does not contain any organic substance which may decompose when placed in a high temperature atmosphere or placed with acid chemicals, not to mention flammable material such as activated charcoal. Accordingly, the filter according to the present invention is superior in a disaster prevention standpoint of view. Moreover, baking at a high temperature after impregnating with acid chemicals such as salt of inorganic acid, becomes possible. Accordingly, impurity gas which causes a problem when applied to a clean space, can be desorbed in advance. As a result, when air is passed through the filter at a speed of 1 m/s, the amount of the outgas from the air filter can be reduced to less than 1 ppb.

Life of the conventional adsorbent made of activated charcoal and the inorganic adsorbent used in the air filter of the present invention is considered. First, the measurement result of each impregnation amount of the salt of inorganic acid to activated charcoal and the inorganic substances will be shown in Table 2. The impregnation amount with various kinds of the salts of the inorganic acids per unit weight of the activated charcoal and the inorganic substance are shown in percentage by weight. The weight of the charcoal and the inorganic substance are weighed in a dry state without containing moisture. The charcoal and the inorganic substance are immersed for 30 minutes in an aqueous solution of various kinds of the salts of the inorganic acids having the concentration from 24% to 28%, and after pulling them up, they are dried in the air for two hours at 120° C. Then, the impregnation amounts of the various salts of the inorganic acids are measured. "Activated charcoal particulate Shirasagi GX for gas phase adsorption" (Trade name, manufactured by TAKEDA YAKUHIN Co., Ltd.) is used. The specific surface area of the activated charcoal is 1200 m$^2$/g, and the pore volume is 0.86 cc/g. The specific surface area and the pore volume of silica, alumina series adsorber, and synthetic zeolite are shown in Table 5 which will be described later.

TABLE 2

Measurement result of the amount of impregnation of salt of inorganic acid to powder of activated charcoal and inorganic substance.
(chemicals impregnation amount(g)/weight of the activated charcoal of inorganic substance (g)) × 100[%]

| Kinds of salt of inorganic acid | Titanyl sulfate | Aluminum sulfate | Zirconium sulfate | Sodium hydrogen sulfate | Potassium hydrogen sulfate |
|---|---|---|---|---|---|
| Concentration of salt of inorganic acid (%) | 24 | 27 | 28 | 24 | 24 |
| Activated charcoal | 15 | 34 | 37 | 17 | 20 |
| Diatom earth | 39 | 84 | 96 | 42 | 51 |
| Silica gel | 96 | 206 | 239 | 107 | 123 |
| Alumina gel | 95 | 200 | 240 | 105 | 120 |
| Mixture of silica and alumina | 90 | 195 | 235 | 104 | 120 |
| Aluminum silicate | 96 | 203 | 237 | 106 | 122 |
| Activated alumina | 47 | 100 | 116 | 51 | 60 |
| Porous glass | 24 | 52 | 57 | 26 | 30 |
| Activated clay | 58 | 123 | 145 | 64 | 73 |
| Activated bentonite | 36 | 76 | 90 | 40 | 46 |
| Synthetic-zeolite (hydrophilic) | 70 | 150 | 175 | 78 | 90 |

Note), The weight of activated charcoal or inorganic substance is the weight in a dry state without containing moisture.

As shown in Table 2, the inorganic substance such as silica, alumina series adsorber, synthetic zeolite can be much more increased in the impregnation amount than charcoal. Accordingly, series of the inorganic adsorbent such as the air filter of the present invention has an adsorptive life for gaseous basic impurities longer than the activated charcoal adsorbent.

Next, the consideration on the point of outgas will be described. In the chemical filter formed in a felt shape by combining the fibrous activated charcoal impregnated with chemical such as salt of inorganic acid etc., with organic binder such as polyester having a low melting point or polyester non-woven fabric, or in the chemical filter formed in a block shape and a sheet shape by firmly fixing the particulate charcoal impregnated with chemicals to a urethane foam or non-woven fabric using an adhesive, the outgas of organic impurity gas is generated from organic constituent itself in the organic binder, the urethane foam, the non-woven fabric, and the adhesive. The outgas of organic impurity gas is generated also from the reaction between the organic constituent and the impregnated acid of the chemicals.

For the reduction of the outgas, the so-called baking in which the whole filter is heated at a high temperature is effective. However, these organic constituents themselves start dissolving by heating only at 100° C. to 150° C., before 390° C. which is the ignition point of activated charcoal, which makes it impossible to use for a filter. Additionally, the filter having activated charcoal ignites nearly at 380° C. which is the decomposition temperature of zirconium sulfate when zirconium sulfate is used as a salt of inorganic acid, which makes it impossible to raise the temperature as high as 350° C.

On the other hand, in the air filter of the present invention which consists solely of inorganic materials, the whole supporter formed of the inorganic material layer before impregnation with salt of inorganic acid can be baked at a high temperature above 350° C., so that the outgas generated from the impurities contained in the inorganic material layer can be completely removed by this baking treatment. Each powder usable for the present invention, shown in Table 5 which will be described later, does not change in pore property so much when it is heated to 350° C., thus, the heating to 350° C. does not give negative influence to the performance and the specification as a filter.

A conventional chemical filter formed in a felt shape by combining fibrous activated charcoal impregnated with phosphoric acid, and organic binder such as low melting point polyester and polyester non-woven fabric, and an air filter produced in such that the whole honeycomb supporter formed out of an inorganic material layer consisting of, for instance, silica gel as the supporter of the present invention, is heated to 350° C. for one hour, then immersed in an aqueous 27 wt % solution of aluminum sulfate 14 to 18 water (Trade name "Shika Tokkyu", manufactured by KAN-TOH KAGAKU Co., Ltd.) for 30 minutes. After pulling it up, it is dried for 2 hours under a current of air at 120° C. Table 3 shows soluble outgas concentration detected with an ion-chromatography when purified air in a rated air quantity is allowed to pass through these air filters. The measurement result of the concentration of impurity gas contained in the purified air is shown as a background value.

TABLE 3

Measurement result of the outgas concentration of the conventional air filter and air filter according to the present.
(vol ppb)

| | Acetic acid | Formic acid | NH$_3$ | Chlorine | SO$_2$ | NO$_2$ |
|---|---|---|---|---|---|---|
| Conventional activated charcoal filter | 30 | 1.8 | 0.22 | 0.07 | 0.00 | 0.02 |
| Air filter of the present invention | 0.71 | 0.19 | 0.02 | 0.10 | 0.00 | 0.10 |
| Background with only purified air | 0.02 | 0.01 | 0.01 | 0.02 | 0.00 | 0.05 |

According to the result, by using the air filter relating to the present invention, generation of the outgas from the filter itself can be confirmed to be far less than that by the conventional activated charcoal filter. Acetic acid and formic acid in the table are considered to be organic acid formed by the reaction between the organic constituents contained in the filter and the impregnated acid of the chemicals. As for $NH_3$, chlorine, and $NO_2$, they are considered to be derived from the impurities originally contained.

Next, the method for manufacturing will be discussed. The filter uses an inorganic adsorber according to the present invention, and when the filter kept dry after dehydrated is immersed in the chemical solution (solution of salt of inorganic acid) under atmospheric pressure circumstances, the chemical solution easily penetrates into the inside of the pore due to its hygroscopic property. On the other hand, the activated charcoal is hydrophobic in nature, and the chemical solution is hard to penetrate into the pore. Accordingly, in the previously known art, the pressure reduction/pressure application process was necessary in order to carry out the penetration. Therefore, the impregnated amount of chemicals by immersion under atmospheric pressure, is far more with the inorganic adsorber than with activated charcoal adsorber as shown in Table 2.

Table 4 shows the impregnation amount of various kinds of salts of inorganic acids for the following each case.

First case is that powder of silica gel, that is an inorganic substance, is dried in the air at 120° C. for one hour to reduce the water content less than 1% of the total weight, and is kept in a dry box.

The second case is that the silica gel powder having water content about 30% of the total weight is kept long in a normal room atmosphere (about 20° C., relative humidity 50%).

Each of the above silica gel is immersed in aqueous solution of various kinds of salts of inorganic acids having concentration from 24 wt % to 28 wt % for 30 minutes and is pulled up. Then it is dried in the air at 120° C. for 2 hours.

TABLE 4

Difference of the impregnation amount of various kinds of salts of inorganic acids regarding to the presence or absence of dehydration treatment to the silica gel.
(impregnation amount of chemicals (g)/weight of activated charcoal or inorganic substance (g)) × 100[%]

| Condition of the silica gel | Titanyl sulfate | Aluminum sulfate | Zirconium sulfate | Sodium hydrogen sulfate | Potassium hydrogen sulfate |
| --- | --- | --- | --- | --- | --- |
| No dehydration | 96 | 206 | 239 | 107 | 123 |
| Dehydration | 121 | 260 | 313 | 134 | 159 |

As apparent from Table 4, the impregnation amount of various salt of inorganic acid can be increased by 25% to 33% when the silica gel is dehydration-treated compared with the case without dehydration. This is because water in the pore of the silica gel is driven out by the dehydration treatment, so that the solution can be easily penetrated into the pore on immersing in the solution of the chemicals.

The reason why the salt of the inorganic acid is used in place of the organic acid as the impregnation chemicals to the adsorber is as follows. The organic acid is called carboxylic acid, and the number of compounds having carboxylic group (—COOH) is said to be from a few thousand kinds to tens of thousands kinds. If carboxylic acid desorbs as a gaseous material by any chance, it becomes an organic contamination material. In addition, when an air filter containing the organic acid is used for a long time in a clean room, even if there is no gasification of the organic acid itself, there arises a fear that the organic acid is gradually decomposed into a substance like acetic acid which is easy to gasify, by breeding of a microorganism which takes the organic acid as a nutritive source, thereby causing new contamination by the gaseous decomposition material. Furthermore, once the organic acid decomposes, its initial function as the organic impregnation chemicals to neutralize and chemically adsorb the gaseous basic impurities is lost. On the other hand, salt of inorganic acid can not be a nutritive source for a microorganism, and, salt of inorganic acid is known to have a sterilizing function against the microorganism. Accordingly, for the impregnation material to the adsorber used in the clean room, a salt of an inorganic acid is more preferable than an organic acid.

On the other hand, there are many inorganic acids which are hazardous materials to human body if they have high acidity (for instance, hydrochloric acid, sulfuric acid, nitric acid, etc.). In addition, when an air filter containing strongly acidic inorganic acid is left in an environment as a waste, the inorganic acid dissolved in a rain-water causes water pollution. Consequently, a salt of an inorganic acid which is small in acidity and less hazardous to the human body, is suitable as the acid substance to impregnate to the adsorber.

There are two kinds of zeolite, natural zeolite and synthetic zeolite, and industrially synthetic zeolite is more widely used than natural zeolite which is poor in purity. Natural zeolite has pores in various sizes from 3 to 10 angstroms, but it is possible for the synthetic zeolite to produce pores uniform in size.

In the present invention, when synthetic zeolite is used as the material to be filled between individual particles of the adsorbent, the individual zeolite particles are filled between individual particles of the adsorbent in which a salt of an inorganic acid is impregnated to powder of the inorganic substance, and gaps to be air-permeable pores are formed in the adjacent portions between the adsorbent particles and zeolite particles. The air-permeable pore has a function in a manner that the object air to be cleaned can reach the salt of the inorganic acid impregnated to the adsorbent particle.

The pores which the synthetic zeolite itself possesses, adsorb and remove gaseous organic impurities with particle diameter smaller than the size of the pores, when the object air to be cleaned passes through the. air-permeable pores. Accordingly, if any synthetic zeolite is selected, which has a suitable pore size according to the kind of the gaseous organic impurities contained in the object air to be cleaned, it is possible to design an air filter having excellent performance to adsorb gaseous organic impurities.

As the silica of the present invention silica gel may be used, while alumina gel may be used as alumina. Similarly, the mixture of silica gel and alumina gel may be used as the mixture of silica and alumina.

In the present invention, as for the constituent having a pellet, gaps to be air-permeable pores, are formed in the portions where particulates of powder of the adsorbent or particulates of powder of the inorganic binder are adjacent to each other, and the object gas to be cleaned passes through the air-permeable pores from the surface of the pellet to come into the inside of the pellet or to come out from the inside of the pellet to the outside. Then, the basic gaseous impurities in the air are adsorbed and removed by the adsorbent.

In the present invention, gaseous basic impurities in the clean room air can be adsorbed and removed by means of the adsorbent. And gaseous organic impurities such as DOP (di-octyl phthalate), DBP (di-butyl phthalate), BHT (butyl hydroxytoluene) siloxane and so forth, can be adsorbed and removed by properly selecting powder of an inorganic substance as a binder, which includes micropores and/or mesopores. Accordingly, the filter according to the invention is applicable to even the atmosphere including basic gaseous impurities and gaseous organic substances, which cause the surface contamination of the substrate, and may capture most of these chemical contaminating substances.

In the present invention, as for a filter having a first inorganic material layer and a second inorganic material layer, the exfoliation from the salt of the inorganic acid contained in the first inorganic material layer in the inside of the second inorganic material layer or contained in the first pellet can be prevented by the outer second inorganic layer or the coating layer outside the second pellet, in the case where the first inorganic material layer is placed in the inside, or in the case when the filter is provided with the second pellet. In this case, if powder of inorganic substance forming the second inorganic material layer or the outermost coating layer has pore suitable for physical adsorption of gaseous organic substances such as DOP, DBP, BHT, siloxane, and so forth which cause the surface contamination of the substrate, there exists another advantage in such that these gaseous organic substances can be adsorbed and removed by the pores.

When the first inorganic material layer is placed on the outer side, though the aforementioned dust protection effect vanishes, the adsorption effect for the gaseous impurities remain unchanged. The adsorption and removal of the basic gaseous impurities in the air is performed in the outermost first inorganic material layer which are in direct contact with the air in the clean room, and the adsorption and removal of the gaseous organic impurities in the air is performed in the inner second inorganic material layer.

Here, the aforementioned adsorbent will be briefly explained. The adsorbent is prepared by impregnating a salt of an inorganic acid to powder of an inorganic substance consisting of at least one of diatom earth, silica, alumina, a mixture of silica and alumina, aluminum silicate, activated alumina, porous glass, activated clay, activated bentonite, or synthetic zeolite. For powder of these inorganic substance, Table 5 (I) shows the measurement result by means of the gas adsorption method for the total volume of the pores distributing in the range from 5 to 300 angstroms and the specific surface area of the pores of the inorganic substance.

TABLE 5

Physical property of the pore of various kinds of powders.

| Powder sample | Specific Area($m^2$/g) by BET Method | Pore Volume (cc/g) by N2 Adsorption | |
|---|---|---|---|
| Pore size: 5 to 300 angstroms | | | |
| diatom earth | 200 | 0.25 | (I) |
| silica gel | 400 | 0.61 | |
| alumina gel | 250 | 0.60 | |
| aluminum silicate | 225 | 0.60 | |
| activated alumina | 300 | 0.30 | |
| porous glass | 400 | 0.15 | |
| activated clay | 300 | 0.37 | |
| activated bentonite | 87 | 0.23 | |
| synthetic zeolite | 400 to 750 | 0.35 to 0.55 | |
| Talc | 28 | 0.07 | (II) |
| Kaolin mineral | 21 | 0.06 | |
| Bentonite | 23 | 0.03 | |
| Sepiolite | 295 | 0.33 | (III) |

Silica gel is used as silica for powder sample. Alumina gel is used as alumina for powder sample. The reason to pay attention to pores distributing in the range from 5 angstroms to 300 angstroms is that the pore having size of this range is most suitable for the physical adsorption of the gaseous impurities, and the gaseous basic impurities contained in the object air are apt to be adsorbed in these pores. Since the salt of the inorganic acid is impregnated on the surface of the pore, the gaseous basic impurities neutralize with the salt of the inorganic acid at once to be chemically adsorbed, so that they never desorb again. The larger the specific surface area of powder of the inorganic substance is, the larger the surface to be impregnated with the salt of the inorganic acid and the volume to absorb the gaseous impurities becomes.

However, when the inorganic substance in Table 5 (I) is impregnated with salt of inorganic acid, the salt of the inorganic acid comes into the gap portion of the pore. Accordingly, the specific surface area and the pore volume are considerably decreased when compared with the pure inorganic substance before the impregnation. No inorganic substance in Table 5 (I) initiates a chemical reaction with the impregnated salt of the inorganic acid, so that the capability of chemical adsorption to the gaseous basic impurities in the salt of the inorganic acid is not negatively effected. Diatom earth is hydrous colloidal silicic acid and hard to react with acid. Silica, alumina, a mixture of silica and alumina, aluminum silicate, and porous glass are also hard to react with acid. Activated alumina is obtained by heat dehydration (450° C.) of aluminum hydroxide and is hard to dissolve in acid. Activated clay can be obtained by sulfuric acid treatment of acid clay and is hard to dissolve in acid. Activated bentonite is obtained when calcium type bentonite or acid clay is treated by heated sulfuric acid to eluate aluminum montmorillonite or magnesium montmorillonite, so that excess silicic acid having many pores on the surface thereof is produced. Accordingly, its adsorptive power and the catalytic power are increased and it is hard to be affected by acid. Synthetic zeolite also has a nature not to be easily affected by acid.

On one hand, in all inorganic substances such as talc, kaolin mineral, and bentonite, which are generally used as a binder, as shown in Table 5 (II), the pore volume and the specific surface area of powder distributing in the range from 5 to 300 angstroms are extremely small compared with the inorganic substances in Table 5 (I). The pore volume and specific surface area of powder of sepiolite which is a kind of hydrated magnesium silicate clay minerals having a crystal structure of the ribbon type in Table 5 (III), ranging from 5 to 300 angstroms are large, similar to the inorganic substance in Table 5 (I). However, if the inorganic substance in Table 5 (II) and (III) is impregnated with a salt of an inorganic acid, the hydroxyl group and salt of inorganic acid neutralize with each other like talc ($Mg_3[(OH)_2Si_4O_{10}]$, kaolin mineral ($Al_4[(OH)_8Si_4O_{10}]$) or sepiolite ($Mg_8Si_{12}O_{30}(OH)_2)_4$ 6 to 8$H_2O$) or ion-exchange with each other, or chemically react with salt of inorganic acid by means of the cation exchange function like bentonite. Accordingly, the chemical adsorption function of the salt of the inorganic acid to the gaseous basic impurities is lost.

Since powder of the aforementioned adsorbent (the adsorbent prepared by impregnating the salt of the inorganic acid to powder of the inorganic substance consisting of at least one of diatom earth, silica, alumina, a mixture of silica and alumina, aluminum silicate, activated alumina, porous glass, activated clay, activated bentonite, or synthetic zeolite) has no self-bonding power, in order to pelletize powder of the adsorbent or to fix it on the surface of the supporter in a layer, a binder must be added.

In the present invention, an inorganic material layer is formed by fixing powder of the adsorbent on the surface of the supporter, or a pellet is formed by pelletizing powder of the adsorbent, using powder of an inorganic substance consisting of at least one of talc, kaolin mineral, bentonite, diatom earth, silica, alumina, a mixture of silica and alumina, aluminum silicate, activated alumina, porous glass, hydrated magnesium silicate clay mineral having a crystal structure of the ribbon type, activated clay, activated bentonite or synthetic zeolite as a binder or a filler. Silica may be replaced by, for instance, silica gel, while alumina may be replaced by, for instance, alumina gel. Similarly, the mixture of silica and alumina may be replaced by, for instance, the mixed gel consisting of silica gel and alumina gel.

It is preferable that the supporter for use in the filter according to the invention is made in a form of a honeycomb structure. It is also preferable that the honeycomb structure is formed of inorganic fiber as the indispensable requirement therefore. The adsorptive layer of the honeycomb structure has a ceramic-like solid surface and the amount of exfoliation is extremely small compared with the conventional chemical filter using charcoal impregnated with chemicals or ion exchange fiber. When powder of each inorganic substance is applied to powder of inorganic substance used for fixing the salt of the inorganic acid, or the binder used for fixing thereof on the surface of the supporter in the adsorbent, there is hardly any desorption of gaseous organic substance from the material constituting the air filter of the present invention.

The term "honeycomb structure" as used in the invention stands for not only a structure with the shape of a honeycomb but also any structure including a plurality of cell as an element through which the air can pass, for instance, a structure having a grid shape in section, a structure formed of a plurality of corrugated sheets and so on. Furthermore, the term "supporter" is not limited to the honeycomb structure and may be any of a three dimensional mesh structure like rock wool. In this case, powder of the adsorbent of the present invention is preferably fixed not only on the surface of the mesh structure but also to the inside thereof.

As a method to fix the adsorbent to the surface of the supporter, there are a method to fix by a binder made of powder of an inorganic substance, and a method to pelletize powder of the adsorbent into pellets using powder of the inorganic substance as the binder and to adhere the pellet on the surface of the supporter with an inorganic adhesion assisting agent.

In the air filter according to the present invention, when either one of a pellet made by pelletizing the adsorbent using powder of the inorganic substance α as a binder or a filler, or a second pellet formed by coating with powder of the inorganic substance β around the first pellet made by pelletizing the adsorbent with powder of the inorganic substance, is filled in a casing, flexibility in design can be obtained so as to properly select the shape and size of the casing, and the amount of the pellet filled in the casing according to the shape and size of the flow path of the air, and the installation requirement of the filter.

According to the present invention, flexibility in design can be obtained so as to be able to properly select the shape and size of the casing, and the amount of the pellet filled in the casing according to the shape and size of the flow path of the air and the installation requirement of the filter.

In instances where both gaseous basic impurities and gaseous organic impurities are required to be completely removed, in the inorganic substance, the inorganic substance α, and the inorganic substance β used as the binder of the adsorbent, the total pore volume of powder having the diameter in the range from 5 to 300 angstroms is preferably equal to or more than 0.2 cc/g, or the specific surface area of the pore is preferably equal to or more than 100 $m^2/g$. Whatever the case may be, each powder of these inorganic substance, the inorganic substance α, and the inorganic substance β contained in the inorganic material layer or the pellet used as a binder for powder of the adsorbent, has the capability to mechanically fix powder of the adsorbent on the surface. of the supporter, the capability to act as a binding agent for pelletizing powder of the adsorbent into a pellet, and also has a porous structure in such that the object gas to be cleaned can easily arrive at or return from the salt of the inorganic acid impregnated to the surface of the inorganic powder consisting the adsorbent. The object air to be cleaned can easily reach the salt of the inorganic acid impregnated to the surface of the adsorbent powder through the air-permeable pore or gap formed in the adjacent portion between each powder of the inorganic substance, the inorganic substance α, and the inorganic substance β used as the adsorbent and the binder, so that gaseous basic impurities are removed. During this process, the gaseous organic impurities are physically adsorbed on the surface of the pores having a pore diameter in the above-mentioned range existing on the surface of the aforementioned inorganic powder used as a binder or a filler, and removed. Accordingly, besides the removal of gaseous basic impurities, which is one of the main purposes of the invention, the removal of gaseous organic impurities can be secondarily achieved by means of the pore of each inorganic powder described before which is used as a binder or a filler.

The specific surface area and the pore volume of the binder belonging to the groups (I) and (III) in Table 5 are considerably larger than those of the binder belonging to the group (II). Therefore, the binders (I) and (III) are superior to those of the group (II) in terms of the physical adsorption function against gaseous organic impurities. The inorganic binders of the group (II), for instance talc, kaolin mineral, and bentonite are selected and used primarily taking account of air permeability of the porous structure constructed therewith. Most of air permeable pores that are formed between adjacent binder particulates and also between the binder particulates and the adsorbent particulates fixed to the supporter, have a size of about 500 angstroms or more. In other words, these air permeable pores are excellent in air permeability, but are in the macropore range and less contribute to the physical adsorption. Furthermore, the particulate surface of the inorganic binder such as talc, kaolin mineral, and bentonite, includes few pores capable of performing the physical adsorption of gaseous organic impurities. By the way, the pore volumes of the pore size in the range from 150 to 150,000 angstroms measured by the liquid mercury press-in method for each powder of talc, kaolin mineral, and bentonite are 0.92 cc/g, 1.11 cc/g, and 0.49 cc/g, respectively. It is found that the group (II) have few micropores and mesopores relating to the physical adsorption, but mostly have macropores excellent in air permeability, when compared with Table 5.

Consequently, the inorganic binder of the group (II) in Table 5 is primarily used for the purpose of mechanically holding powder of the adsorbent on the surface of the supporter. The quantity of powder of the adsorbent to be held on the supporter surface is preferably increased as much as possible in order to sufficiently remove gaseous inorganic impurities. On the other hand, the quantity ratio of the inorganic binder to powder of the adsorbent is preferably as small as possible. However, if the quantity of the inorganic binder is reduced excessively, powder of the adsorbent is incompletely held on the supporter surface, which might cause powder of the adsorbent to peel off and make it act as a kind of a dust source. For instance, when forming the inorganic material layer by fixing powder of the adsorbent to the supporter surface, using bentonite as an inorganic binder along with silica sol as an inorganic adhesion assisting agent, if the weight ratio of powder of the adsorbent to the entire inorganic material layer on the supporter surface exceeds 75%, it is found that the mechanical strength for holding the inorganic material layer on the supporter surface is impracticably weakened. In short, the role of the inorganic binder of the group (II) is to firmly hold the inorganic material layer on the supporter surface and at the same time, to secure such excellent air permeability that the object gas can reach powder surface of the adsorbent with ease, but is not required to physically adsorb gaseous organic impurities.

On the other hand, in the case of the inorganic binder of the group (I) and (III) in Table 5, the air permeable pores that are formed between adjacent binder particulates and also between the binder particulate and the adsorbent particulate, have a size similar to that of the air permeable pore formed with the inorganic binder of the group (II). It should be noted that the pore volumes having the pore diameter in the range from 150 to 150,000 angstroms measured by the liquid mercury press-in method for powder in the group (II) are 0.8 cc/g, to 1.7 cc/g, respectively. The specific volume having the pore diameter in the range from 150 to 150,000 angstroms measured by the liquid mercury press-in method for sepiolite in the group (III) is 1.6 cc/g. Thus, the excellent air permeability is secured and the object gas can easily reach powder surface of the adsorbent, so that removal of gaseous basic impurities is carried out in the same manner as in the case of the binder belonging to the group (II).

The strength of the physical adsorption by the pore against gaseous molecules increases in the order of macropore, mesopore, and micropore. It is said in general that the macropore hardly contributes to the physical adsorption. The particulate of the inorganic binder of the group (I) (III) has on its surface the pore suitable for carrying out the physical adsorption against gaseous molecules, namely the micropore with the pore diameter of 20 angstroms or less, and the mesopore with the pore diameter in the range of 20 to 500 angstroms, so that gaseous organic impurities such as DOP, DBP, BHT, siloxsane which are hard to be removed by powder of the adsorbent and cause the surface contamination of the substrate, can be physically adsorbed and removed at powder surface of the binder particulates.

When the binder of the group (I) and (III) in table 5, the ratio (weight base) of the adsorbent powder to the inorganic material layer on the supporter surface has an upper limit value. For instance, when forming the inorganic material layer by fixing powder of the adsorbent to the supporter surface, using silica gel as an inorganic binder, if the weight ratio of powder of the adsorbent to the entire inorganic material layer exceeds 72%, it is found that the mechanical strength for holding the inorganic material layer on the supporter surface is impracticably weakened.

In the air filter of the invention, in which the adsorbent is fixed on the surface of the supporter using an inorganic powder of the groups (I) and (III) in Table 5 as a binder or a filler, and the air filter in which pellets made of the adsorbent is fixed on the surface of the supporter using the above-described powder as a binder, the supporter is coated with the inorganic material layer or the pellet layer to adsorb and remove gaseous organic impurities. Therefore, even if the supporter includes an organic material that desorbs gaseous organic impurities, the gaseous organic impurities generated from the supporter itself can be adsorbed and removed by the inorganic material layer or the pellet layer covering the supporter, so that the gaseous organic impurities are never mixed again with the once cleaned object air on the downstream side of the filter.

In the air filter according to the present invention, an average pore diameter of the adsorber made of the inorganic powder to which a salt of an inorganic acid is impregnated, is preferably 100 angstroms or more. The salt of the inorganic acids dissolve in the liquid according to the respective solubility, but they lose moisture content during drying process and remain in the adsorbent held by the supporter as the solid state salt of the inorganic acids with a very small moisture content. If the solid state salt of the inorganic acid blocks the pore opening of the adsorber, the gaseous basic impurities to be removed can not reach the gap in the pore. The salt of the inorganic acid fixed on the gap surface inside the pore blocking the opening thereof does not initiate neutralization reaction with the gaseous basic impurities and becomes an invalid component without any contribution to the adsorption. The inventor and others measure the protection efficiency of ammonia by the air filter in which various silica gel having different pore diameters, the pore being impregnated with a salt of an inorganic acid is held on the surface of the supporter, and obtain the result shown in Table 6.

TABLE 6

Protection efficiency of ammonia by the air filter in which various silica gel having different pore diameters, the pore being impregnated with salt of an inorganic acid is held on the surface of the supporter.

| Average pore diameter (Å) | 29 | 44 | 80 | 133 | 183 | 209 | 300 | 420 |
|---|---|---|---|---|---|---|---|---|
| Pore volume (ml/g) | 0.45 | 0.6 | 0.9 | 1.1 | 1.6 | 1.57 | 2.0 | 2.52 |
| Specific surface area (m²/g) | 620 | 550 | 450 | 330 | 360 | 300 | 270 | 240 |
| $NH_3$ Protection efficiency (%) Aluminium sulfate/silica gel 0.3 g/g | 55 | 60 | 90 | 95 | 100 | 100 | 100 | 100 |
| $NH_3$ Protection efficiency (%) Aluminium sulfate/silica gel 0.3 g/g | 55 | 60 | 95 | 100 | 100 | 100 | 100 | 100 |

As clear from the above result, if the average pore diameter of the adsorber is more than 100 angstroms, the opening of the pore is hard to be blocked by the salt of the inorganic salt, and the protection efficiency is nbt reduced.

In the filter of the present invention, either the inorganic material layer, the first inorganic material layer, the second inorganic material layer, the pellet, the first pellet, or the second pellet may include an inorganic adhesion assisting agent. The inorganic adhesion assisting agent is preferably the one selected from sodium silicate, silica, and alumina. In this case, silica sol may be used in place of silica and alumina sol may be used in place of alumina.

The salt of the inorganic acid used in the air filter of the present invention is preferably sulfate.

Main salts of inorganic acids when classified by the sort of the acid are carbonate, hydrochloride, sulfate, nitrate, and phosphate. Among them, carbonate is inferior in adsorption ability of ammonia due to too weak acidity. Hydrochloride might generate gases such as chlorine and hydrogen chloride which are corrosive to metal, thereby making it difficult to utilize. Nitrate produces ammonium nitrate by neutralizing with ammonia but there is danger to explode by heating in a closed state. Phosphate is often impregnated to a conventional filter using activated charcoal for removing gaseous basic impurities because it is weak in acidity and less harmful to the human body. However, when once phosphorous desorbs in a gaseous material, it becomes a contamination material to dopant in Table 1. Accordingly, phosphate is difficult to use in a high efficiency air cleaning apparatus. As above, sulfate is most preferable as the salt of the inorganic acid used in the present invention.

The boiling point of sulfate is preferably more than 120° C. When an inorganic material layer is formed by fixing the adsorbent prepared by impregnating sulfate to powder of an inorganic substance on the surface of the supporter using powder of an inorganic substance as a binder, moisture in the inorganic material layer is evaporated and removed by heat-drying the supporter surface. In such a case, in order to promote water evaporation, the temperature is often set at 110° C. to 120° C. which is above 100° C., the boiling point of water. From this point of view, the boiling point of the sulfate must be above 120° C.

When an air filter having a long life is configured, it is preferable to use an adsorptive material having an ion exchange amount of more than 10 meq/g, because material having an ion exchange amount of less than 10 meq/g has a small adsorptive capacity for basic contamination as an adsorbent. Furthermore, since it is difficult for a substance which is liquid at an ordinary temperature to fix on an inorganic powder, it is preferable to use sulfate which is solid at an ordinary temperature. Among sulfates, substances which satisfy all these requirements are titanyl sulfate, aluminum sulfate, vanadium sulfate, zirconium sulfate, sodium hydrogen sulfate, and potassium hydrogen sulfate.

A method for manufacturing an air filter of the present invention, the salt of the inorganic acid may be dissolved separately in advance in a suspension (an adsorbent is contained as an essential component) to immerse the supporter therein. Then when the supporter is pulled up from the suspension, the salt of the inorganic acid dissolved in the suspension penetrates in the gap portion adjacent to the particulates of the adsorbent powder or powder of the inorganic binder. The supporter is dried thereafter, only moisture is evaporated from the salt of the inorganic acid immersed in the gap portion so that the gap portion becomes an air permeable pore in the inorganic material layer. In short, the solid matter of the salt of the inorganic acid is held on the wall surface inside the air permeable pore. As a result, it becomes possible to extend the life of the filter by increasing the amount of the salt of the inorganic acid; The salt of the inorganic acid dissolved in advance in the suspension has an effect to complement the salt of the inorganic acid lost by dissolving from powder of the adsorbent into the suspension.

According to a method for manufacturing the air filter of the present invention, the filter can be produced only from the materials not generating any gaseous organic impurities. In addition, the air filter can be practically composed only of materials having no flammable substance. Silica may be replaced by silica gel, while alumina may be replaced by alumina gel. Similarly, the mixture of silica and alumina may be replaced by the mixed gel consisting of silica gel and alumina gel. When an inorganic material layer is formed on the surface of the supporter, or when either one of the first inorganic material layer or the second inorganic layer is formed on the other, if a sol-state inorganic adhesion assisting agent is mixed in the suspension, the inorganic material layer, the first and second inorganic material layers will respectively contain the inorganic adhesion assisting agent.

As a salt of an inorganic acid used for the manufacturing of the air filter of the invention, sulfates are preferable as described before. Among them, titanyl sulfate, aluminum sulfate, vanadium sulfate, zirconium sulfate, sodium hydrogen sulfate, and potassium hydrogen sulfate are suitable.

According to the high efficiency air cleaning apparatus of the present invention, the surface contamination caused by the environment on the surface of the substrate to be handled in the space in the high efficiency air cleaning apparatus can be protected by removing the gaseous basic impurities contained in the circulating air in the high efficiency air cleaning apparatus and according to circumstances, by also removing gaseous organic impurities. The high efficiency air cleaning apparatus of the present invention uses neither flammable activated charcoal nor flammable ion exchange fiber, thereby making it superior in preventing fire. Accordingly, the air filter and the filter to remove particulate impurities can be placed on the ceiling portion of the space.

BEST MODE FOR CARRYING OUT THE INVENTION

The invention will now be described in detail by way of preferred embodiments of the air filter and the method thereof with reference to the accompanying drawings. In the following description, the term "filter" is used to distinguish a filter for removing gaseous impurities in the air, from a filter for removing airborne dusts and particle in the air which will be referred to as a "particulate filter".

Figure 1:
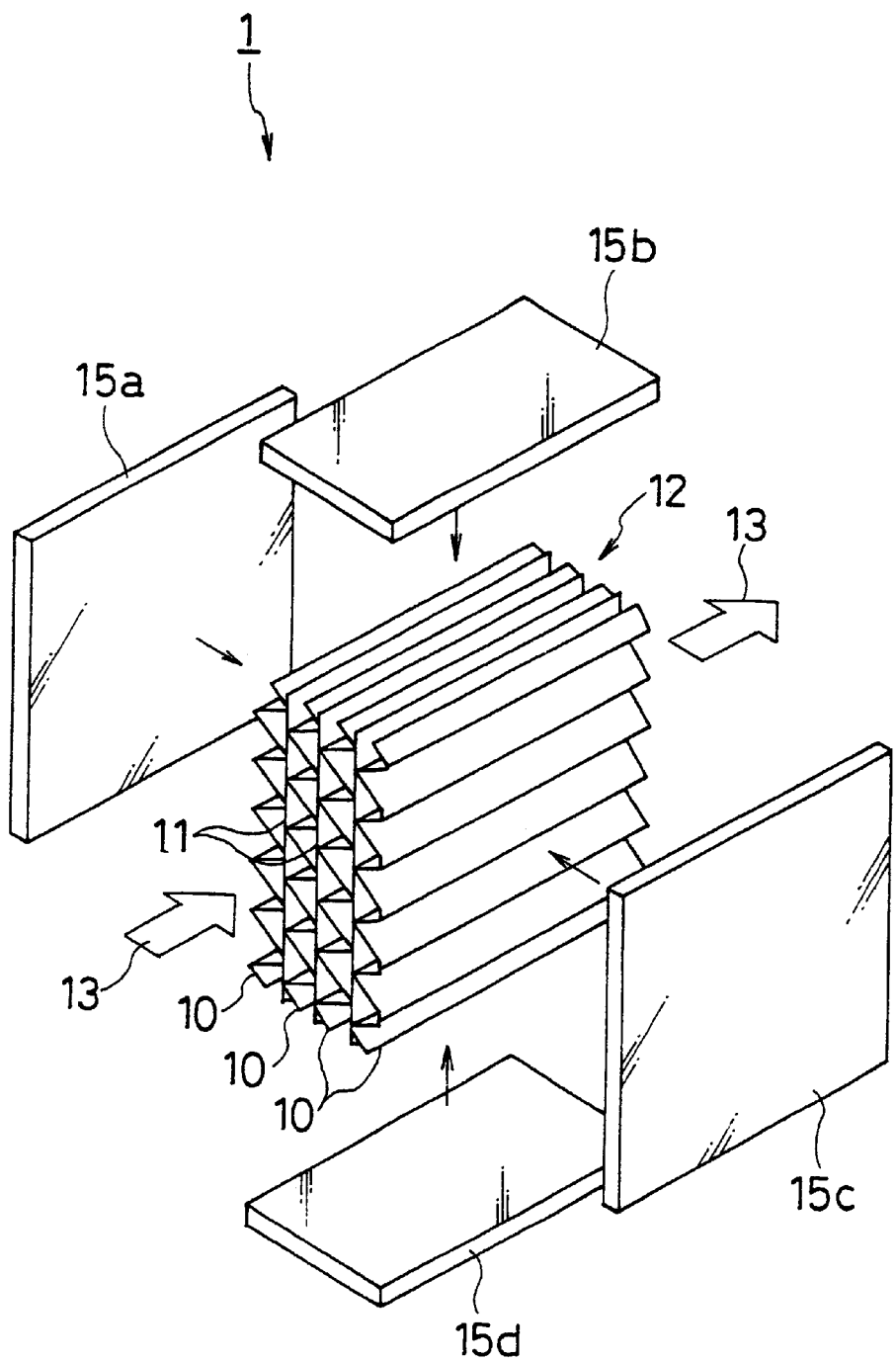
FIG. 1 is a schematic exploded view of a filter according to an embodiment of the invention.

FIG. 1 is a schematic exploded view of a filter 1 according to the invention. As shown, a particulate adsorbent is fixed on the entire surface of a honeycomb structure 12 formed by placing a thin flat sheet 11 between corrugated sheets 10, using powder of an inorganic substance consisting of at least one of talc, kaolin mineral, bentonite, diatom earth, silica, alumina, a mixture of silica and alumina, aluminum silicate, activated alumina, porous glass, hydrated magnesium silicate clay mineral having a crystal structure of the ribbon type, activated clay, activated bentonite or synthetic zeolite as a binder. Powder of the above mentioned inorganic substance used as the binder, is just referred to as "inorganic binder" hereinafter.

As shown in FIG. 1, the filter 1 is provided with a casing in which aluminum panels 15a, 15b, 15c and 15d are assembled into a box to open against the flow direction of an object air to be cleaned (as shown by the hollow arrows 13). In the internal space or room of the casing, the corrugated sheets 10 and the thin flat sheets 11, on the surfaces of which the above described particulate adsorbent are fixed using the inorganic binder, are alternately stacked in parallel to the flow direction 13 of the object air to be cleaned. The configuration and dimension of the filter 1 can be designed at will to correspond the space available for installation.

An instance of a method for manufacturing the filter 1 will now be explained. First three materials, inorganic fiber (for example, ceramic fiber, glass fiber, silica fiber, alumina fiber or the like), organic material (for example, mixture of pulp and fused vinylon) and calcium silicate, are mixed with each other at a weight ratio of 1:1:1. Then, a roll of thin paper-like filter media sheet having a thickness of 0.3 mm is formed out of the above mixture by means of a wet type paper making method. In preparation of the above mixture, calcium silicate may be replaced with clay mineral having a fibrous crystal structure, for instance, sepiolite or palygorskite, which includes magnesium silicate as a main component. The thin flat filter media sheet 11 can be obtained by processing thus obtained sheet into a thin panel, and the corrugated filter media sheet 10 can be obtained by processing with a corrugating machine. The corrugated filter media sheet 10 is fixed to the thin flat filter media sheet 11 with an adhesive to obtain a honeycomb structure 12 as shown in FIG. 1.

The honeycomb structure 12 is then treated by means of heat for about one hour in an electric furnace at about 400° C. to remove all the organic components contained in the filter media. This removal of organic components causes numerous number of tiny pores or recesses in a micron order to formulate over the surface of the honeycomb structure 12, thus it being made porous. These pores will serve as receptacles allowing particulates of the adsorbent and the inorganic binder to rest therein later.

Figure 2:
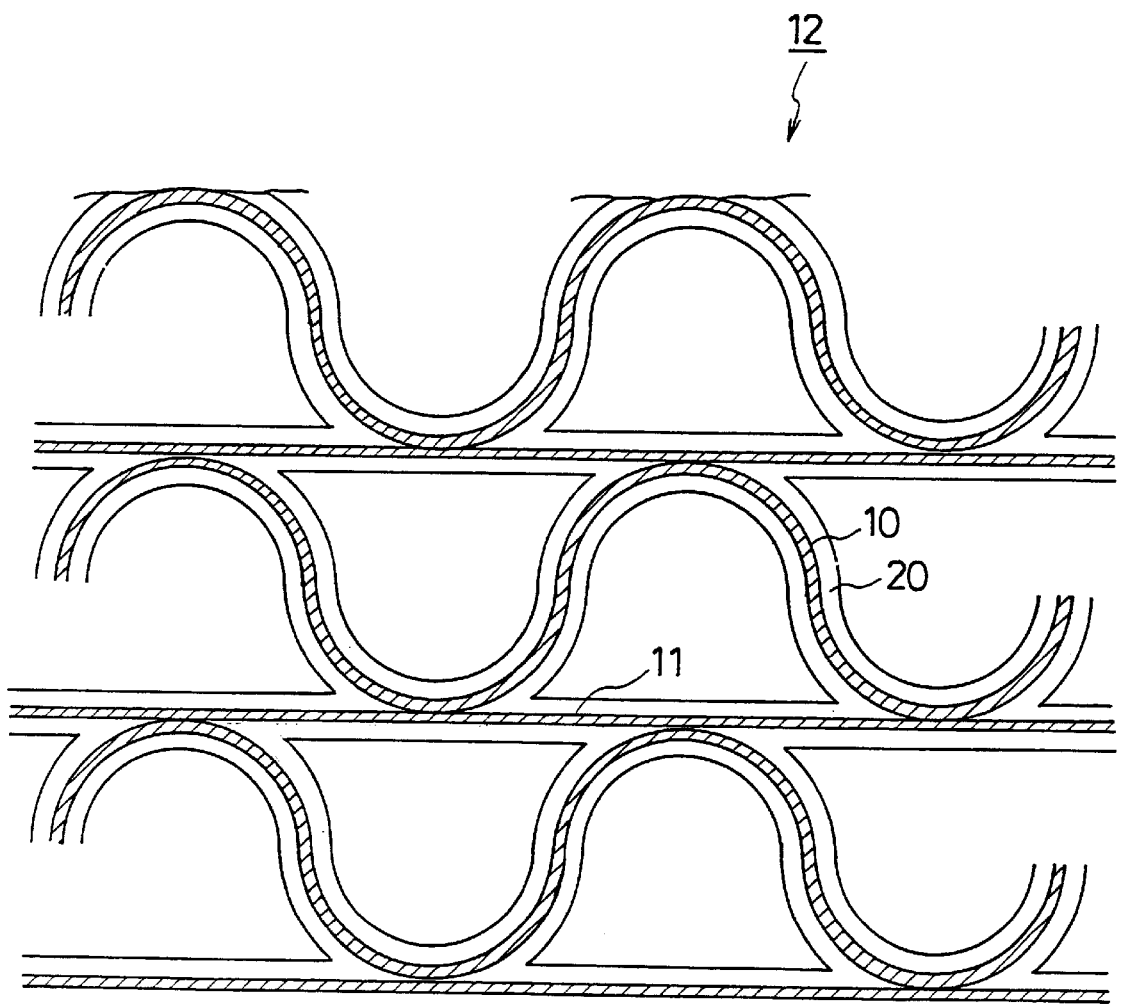
FIG. 2 is a partly enlarged sectional view of a filter in which an inorganic material layer is formed by fixing an inorganic powder impregnated with a salt of an inorganic acid to the surface of a honeycomb structure with an inorganic binder.

Next, the honeycomb structure 12 is immersed in a suspension in which powder of the aforementioned adsorbent which is formed by impregnating salt of an inorganic acid to powder of an inorganic substance consisting of at least one of diatom earth, silica, alumina, a mixture of silica and alumina, aluminum silicate, activated alumina, porous glass, activated clay, activated bentonite or synthetic zeolite, and an inorganic binder are dispersed for several minutes. Then the honeycomb 12 is pulled up to dry at around 200° C. for about 1 hour, thereby obtaining the filter 1 having an inorganic material layer 20 in which the aforementioned powder of the adsorbent is fixed by the inorganic binder on the surface of the honeycomb structure 12, as shown in FIG. 2.

The above-mentioned suspension may include an inorganic adhesion assisting agent, for instance at least one of sodium silicate, silica, and alumina. For instance, silica sol can be used as silica and alumina sol can be used as alumina. Silica sol and alumina sol change into silica gel and alumina gel respectively after being fixed on the surface of the honeycomb structure 12. The inorganic adhesion assisting agent functions of firmly fixing powder of the adsorbent and the inorganic binder to the surfaces of the honeycomb structure 12 (including the inner surface of each cell which is an element of the honeycomb structure 12 (hereinafter understood as the same)).

Provided that the salt of the inorganic. acid is dissolved in advance into the suspension separately from the adsorbent, the salt of the inorganic acid dissolved in the suspension is impregnated into gaps among powder of the adsorbent, powder of the inorganic binder and the particulates of the inorganic adhesion assisting agent when the honeycomb structure 12 is pulled up from the suspension. When the pulled-up honeycomb structure 12 is dried by heat treatment, only water is evaporated from the salt of the inorganic acid impregnated in the gaps, thereby the gaps change to air permeable gaps or pores of the inorganic material layer 20. That is, the solid contents in the salt of the inorganic acid are fixed on the inner wall surfaces of the air permeable pores. If the amount of the salt of the inorganic acid impregnated to the aforementioned adsorbent constituting the inorganic material layer 20 is insufficient for the removal of gaseous basic impurities for a long time, in other words, even if the life of the filter of the present invention to remove gaseous basic impurities is short, the life of the filter in the present invention can be extended by dissolving the salt of the inorganic acid in the suspension in advance separately from the above adsorbent and thus increasing the quantity of the salt of the inorganic acid fixed in the filter.

Furthermore, when the salt of the inorganic acid is not dissolved in the suspension, it is possible to increase the quantity of the salt of the inorganic acid fixed in the filter by immersing the honeycomb structure 12 which is pulled up from the suspension and dried by the heat treatment, in a solution of the salt of the inorganic acid and drying again by heat treatment.

Still further, the following example can be cited as another method of manufacturing. First, the honeycomb structure 12 is immersed in a suspension in which powder of the inorganic material for the adsorbent and the inorganic binder are mixed and is pulled up from the suspension to dry. After drying, the honeycomb structure 12 is immersed in a solution of the salt of the inorganic acid. Then the honeycomb structure 12 is pulled up from the solution to dry. This method is efficient when a salt of an inorganic acid in use has large solubility, for instance, zirconium sulfate. That is, when the honeycomb structure 12 is immersed in the above-described suspension and dried, the adsorbent becomes in a good hygroscopic state, thereby enabling to increase the quantity of the salt of the inorganic acid to be fixed to the adsorbent.

Still further, as another method for manufacturing the filter, the honeycomb structure 12 is immersed in the suspension in which the inorganic powder for the adsorbent and the inorganic binder are mixed in a solution of the salt of the inorganic acid, and the honeycomb structure 12 is dried after that. Accordingly, it is possible to reduce the steps in the manufacturing process, since the adsorbent and the salt of the inorganic acid are not impregnated separately, and immersing and drying are completed in a single process.

The filter 1 as finished in the way like the above, neither includes any flammable material as its constituent, nor desorbs any of gaseous organic impurities which cause surface contamination of the product, because they are completely removed away from materials constituting the filter during the above-mentioned heat treatment. Thus, the filter 1 itself never desorbs gaseous organic impurities.

An example of a method for manufacturing the above-described adsorbent itself, in which a salt of an inorganic acid is impregnated to powder of an inorganic substance consisting of at least one of diatom earth, silica, alumina, a mixture of silica and alumina, aluminum silicate, activated alumina, porous glass, activated clay, activated bentonite, or synthetic zeolite, will now be described.

Sodium is removed from sodium silicate using ion-exchange resin and the remained silica is turned into a state of particle by using a dispersing agent and a stabilizer such as a pH adjuster. This is silica sol and the salt of the inorganic acid is mixed and dissolved in the silica sol. The mixture may be heated when the solubility of the salt of the inorganic acid is low. When the mixture of the silica sol and the salt of the inorganic acid is dried to eliminate water by evaporating, a silica gel adsorbent with the salt of the inorganic acid fixed is obtained.

Another method for manufacturing the filter 1 will be explained in the following. Up to the formation of the honeycomb structure 12, all the manufacturing steps are identical to those which are described in the above, then the explanation thereof will be omitted. The method is characterized in that the pellets formed by pelletizing powder of the adsorbent are fixed to the entire surface of the honeycomb structure 12, using an adhesive. In the case of pelletizing powder of the adsorbent, there is first prepared a mixture which consists of powder of the adsorbent, an inorganic binder, a proper quantity of water, and an inorganic adhesion assisting agent. When kneading this mixture it is transformed into a material which has clayey viscosity and plasticity and is suitable for pelletization. The kinds of the inorganic binder and the inorganic adhesion assisting agent are the same as those used in the previously described method. If the salt of the inorganic acid is dissolved in a proper quantity of water used for the pelletizing of the above-described powder, it is possible to add the salt of the inorganic acid to the pellet. It is also possible to add the salt of the inorganic acid to the pellet by immersing the pellet manufactured by pelletizing powder of the adsorbent, in a solution of the salt of the inorganic acid and then drying by heat treatment.

Still further, another method for manufacturing the filter 1 will be explained. The difference lies in the surface structure of the pellet. To be more specific, the surface of the pellet is coated with powder of an inorganic adsorbent shown in Table 5 (I) and (III), thereby forming an inorganic material layer capable of adsorbing and removing gaseous organic impurities.

Figure 3:
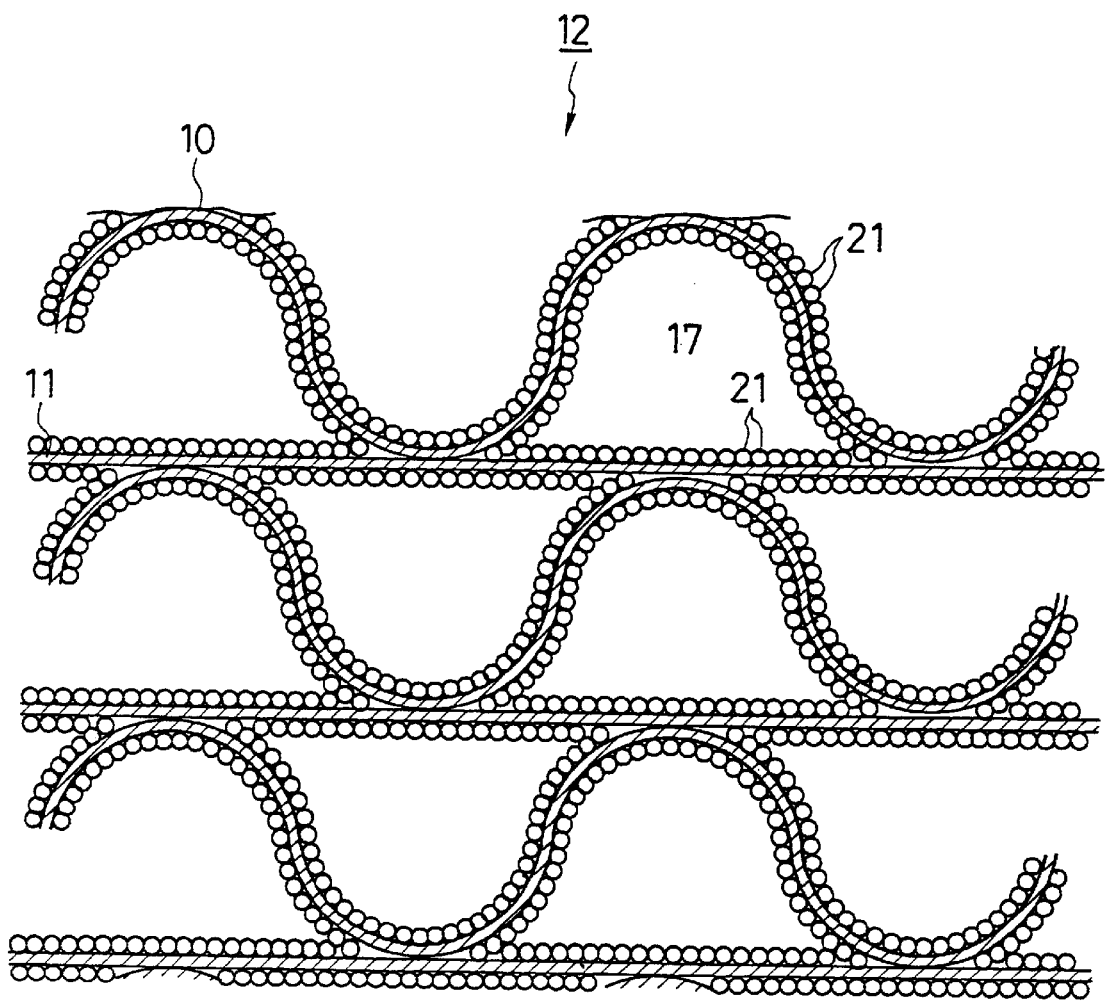
FIG. 3 is a partly enlarged sectional view of a filter composed by fixing pellets made by pelletizing powder of an inorganic substance impregnated with a salt of an inorganic acid on the honeycomb structure surface.

FIG. 3 is a partly enlarged sectional view of the filter 1 which includes the honeycomb structure 12, to the surface of which are fixed pellets 21 formed by pelletizing powder of the adsorbent using the inorganic binder. Pellets 21 are fixed to completely cover the entire surface of each of the corrugated sheets 10 and thin flat sheets 11, using a nonflammable adhesive. In this embodiment, the object air to be cleaned is made to flow through the thin cylindrical space 17 having an approximately semicircular cross section. The honeycomb structure 12 now having pellets 21 fixed to the surface thereof is treated by heat in an electric furnace that is controlled so as to keep a temperature of about 100° C., a temperature which is lower than the heat-resisting temperature of the adhesive, for about 2 hours, thereby completely desorbing and removing gaseous organic impurity components contained in the adhesive which cause the surface contamination. The filter 1 can be manufactured through the process stated above.

The filter 1 thus manufactured does not include any inflammable as its constituent, so that if it is installed to the ceiling portion of the clean room, the safety from the disaster prevention standpoint, can be remarkably enhanced comparing to the case of using the conventional chemical filter employing activated charcoal, ion exchange fiber, etc., which are flammable. The cross section of the individual air path formed in the honeycomb structure is not limited to the semicircular shape. It may be designed to have any kind of shape.

Figure 4:
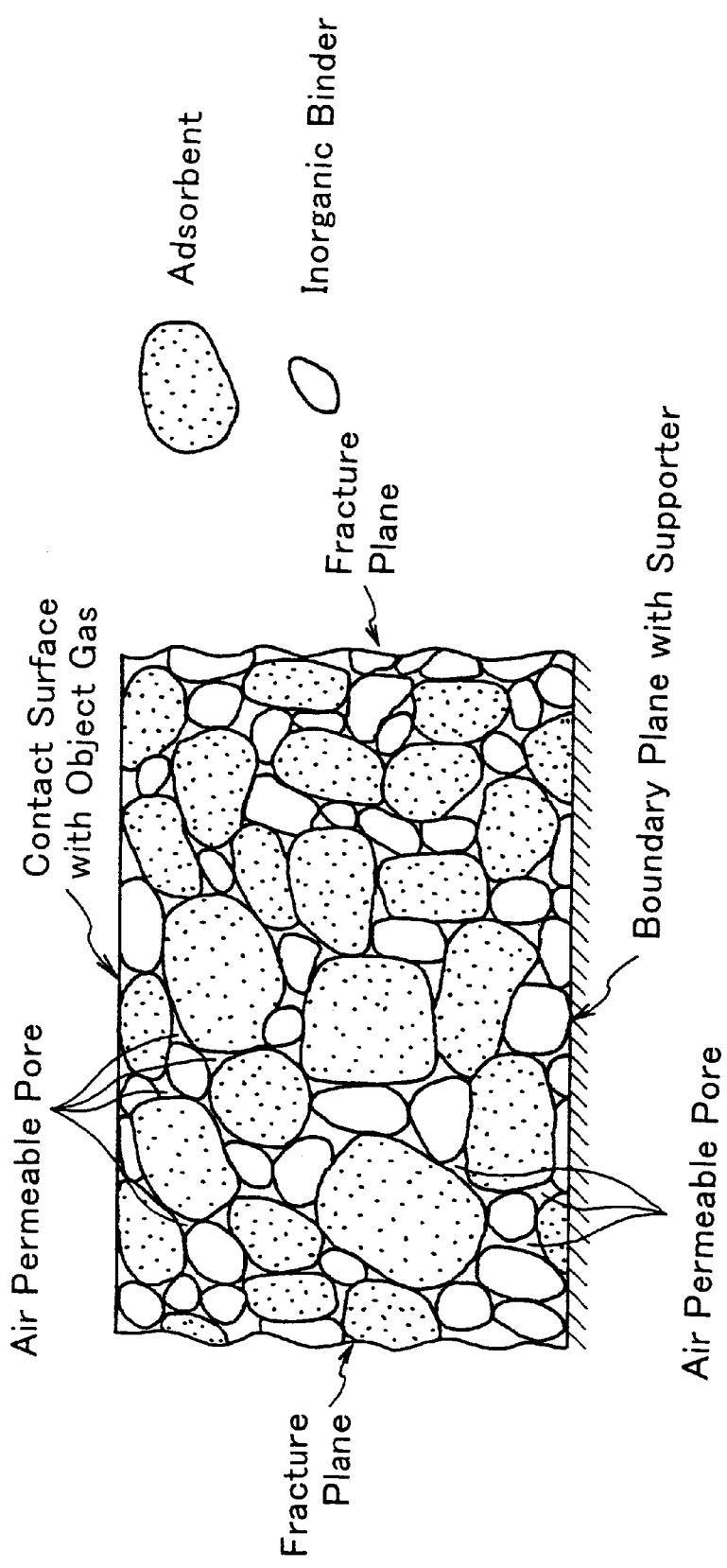
FIG. 4 is a partly enlarged sectional view of an inorganic material layer made by fixing an inorganic powder impregnated with a salt of an inorganic acid of the present invention on the supporter surface with an inorganic binder.

FIG. 4 is a partly enlarged sectional view of an inorganic material layer formed by fixing powder of the adsorbent to the surface of a supporter, using an inorganic binder. The object gas to be cleaned flows into the inorganic material layer from its surface (contact face with the object gas) through air permeable pores formed between particulates of powder of the adsorbent impregnated with the salt of the inorganic acid and particulates of the inorganic binder, and reversely flows out therefrom to the outside. During this process, gaseous basic impurities are removed by the particulates of the adsorbent stated above, and in a case where powder belonging to the group mentioned in Table 5 (I) and (III) is used as an inorganic binder, the molecules of the gaseous organic impurities are physically adsorbed and removed by the pore provided on the surface of the inorganic binder.

In order to achieve, at the same time, the first object of the present invention to remove gaseous basic impurities, and the second object of the present invention to remove gaseous organic impurities, inorganic binder, having mainly pores of mesopore or micropore range such as powders belonging to the group stated in Table 5 (I) and (III), is used to fix the above stated powder of the adsorbent to the honeycomb structure 12 so as to form the inorganic layer 20, for constructing the filter 1. The filter 1 can also be constructed by fixing the pellets 21, made out of powder of the adsorbent using the same inorganic binder as mentioned above, to the surface of the honeycomb structure 12.

Figure 5:
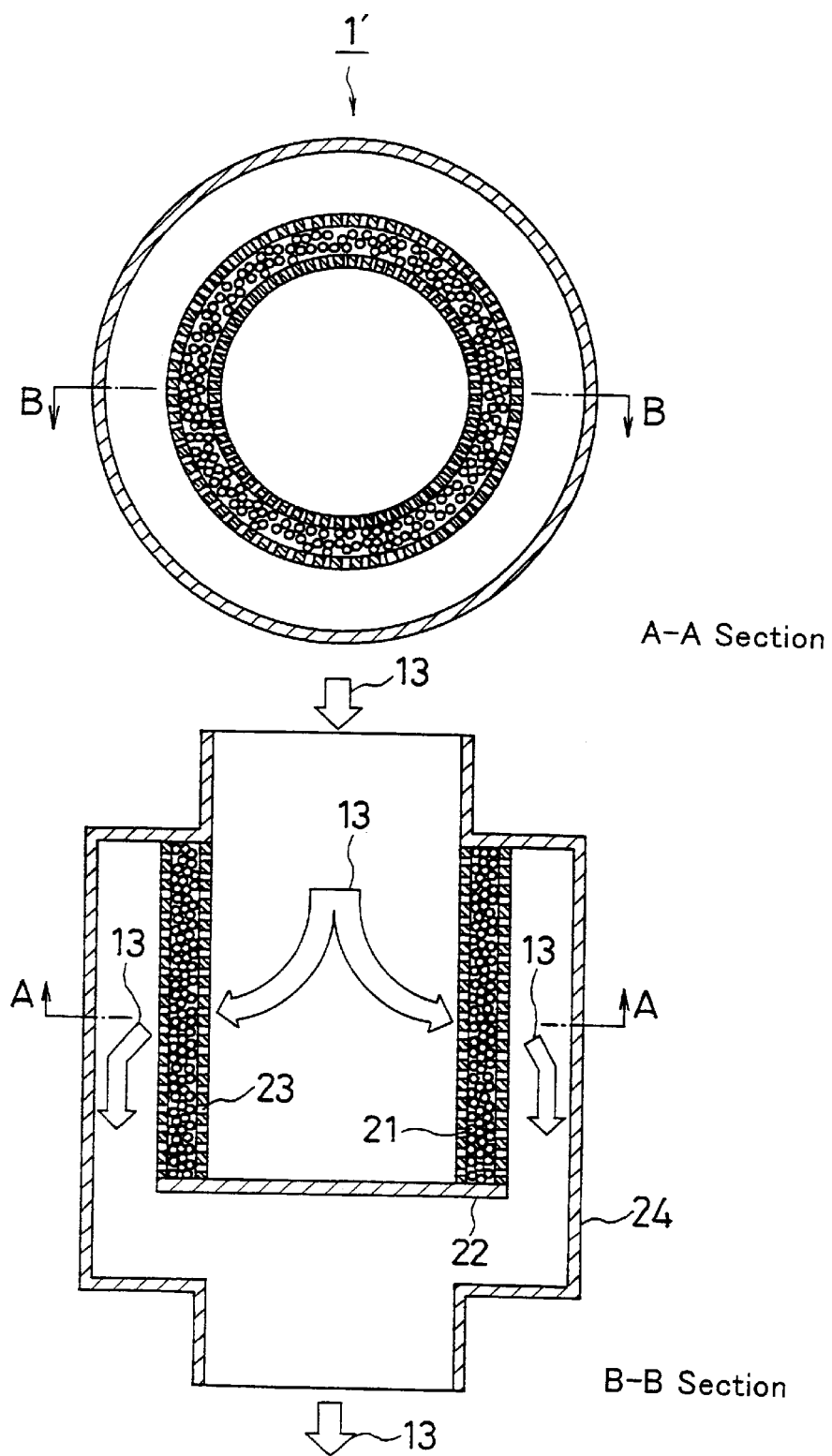
FIG. 5 is transverse and longitudinal sectional views of a cylinder type air filter having a double cylindrical casing which is filled up with pellets made of an inorganic powder impregnated with a salt of an inorganic acid.

Furthermore, as shown in A—A and B—B sectional views of the FIG. 5, the objects of the invention can also be achieved by forming above stated powder of the adsorbent into pellets 21 using mainly inorganic binders having pores of mesopore or micropore range, and by filling the double-cylinder-shaped casing 22 having a number of vent openings 23 on the side with the pellets 21 to construct the filter 1. The object air to be cleaned first flows into the inner cylinder of the casing 22, passes through the adsorbent layer in the casing 22 filled with the pellets 21, flows through the space defined between the outer cylinder of the casing 22 and the outermost cylinder 24, and finally flows out therefrom. Arrows 13 in the figure indicates the flow direction of the object air.

Among the binders belonging to the group (II) described in Table 5, talc and kaolin mineral have a large crystal size and volume in the range of the macropore, but the inner surface area and volume in the range of the micropore and mesopore are small, thus making their physical adsorption function weaker. Bentonite, which also belongs to the binder group (II) described in Table 5, has a large volume in the range of the macropore, but the inner surface area and volume in the range of the micropore and mesopore are small, thus making its physical adsorption function weaker.

On the other hand, among the inorganic binder group (I) and (III) of Table 5, sepiolite belonging to a hydrated magnesium silicate clay mineral having a crystal structure of the ribbon type, includes the micropore of 10 angstroms and the mesopore of 200 angstroms, and its inner surface area and volume are large, thus making its physical adsorption function stronger. Accordingly, the large physical adsorption function may be provided by powder of inorganic substances belonging to the binder group (I) and (III) of Table 5 such as diatom earth, silica (silica gel), alumina (alumina gel), a mixture of silica and alumina (mixture of silica gel and alumina gel), aluminum silicate, activated alumina, porous glass, hydrated magnesium silicate clay mineral having a crystal structure of the ribbon type, acid-treated montmorillonite (activated clay), activated bentonite and synthetic zeolite.

As shown in Table 5, these inorganic substances have the pore volume of 0.2 cc/g or more in their pore diameter range of 5 to 300 angstroms, or the specific surface area of 100 $m^2/g$ or more. Naturally, powder of these inorganic substances may be preferably used for forming the second inorganic material layer which is formed over the first inorganic material layer including powder of the inorganic substance (inorganic substance used for forming the first inorganic material layer as a binder).

In an embodiment where the pellets, made out of powder of the inorganic binder, to be fixed to the supporter is prepared using the inorganic binder having an effective pore diameter in the range of the mesopore or micropore, powder of the adsorbent and powder of the inorganic substance are mixed with city water to make a clayish mixture. This clayish mixture is then processed with the help of a pelletizing machine to produce the pellet having a diameter of around 0.3 mm to 0.8 mm. The pellet is then sprayed with a high speed air jet against the supporter, pretreated with an nonflammable inorganic adhesive, to make the filter of the present invention as shown in FIG. 3. In this case, it is not always required that the supporter is in the form of the honeycomb structure. It may have a three-dimensional mesh structure such as rock wool. This mesh structure demonstrates a high air resistance since the object air passes across the mesh structure, but it gives the object air more opportunities to get in contact with adsorbents than the honeycomb structure does.

Figure 6:
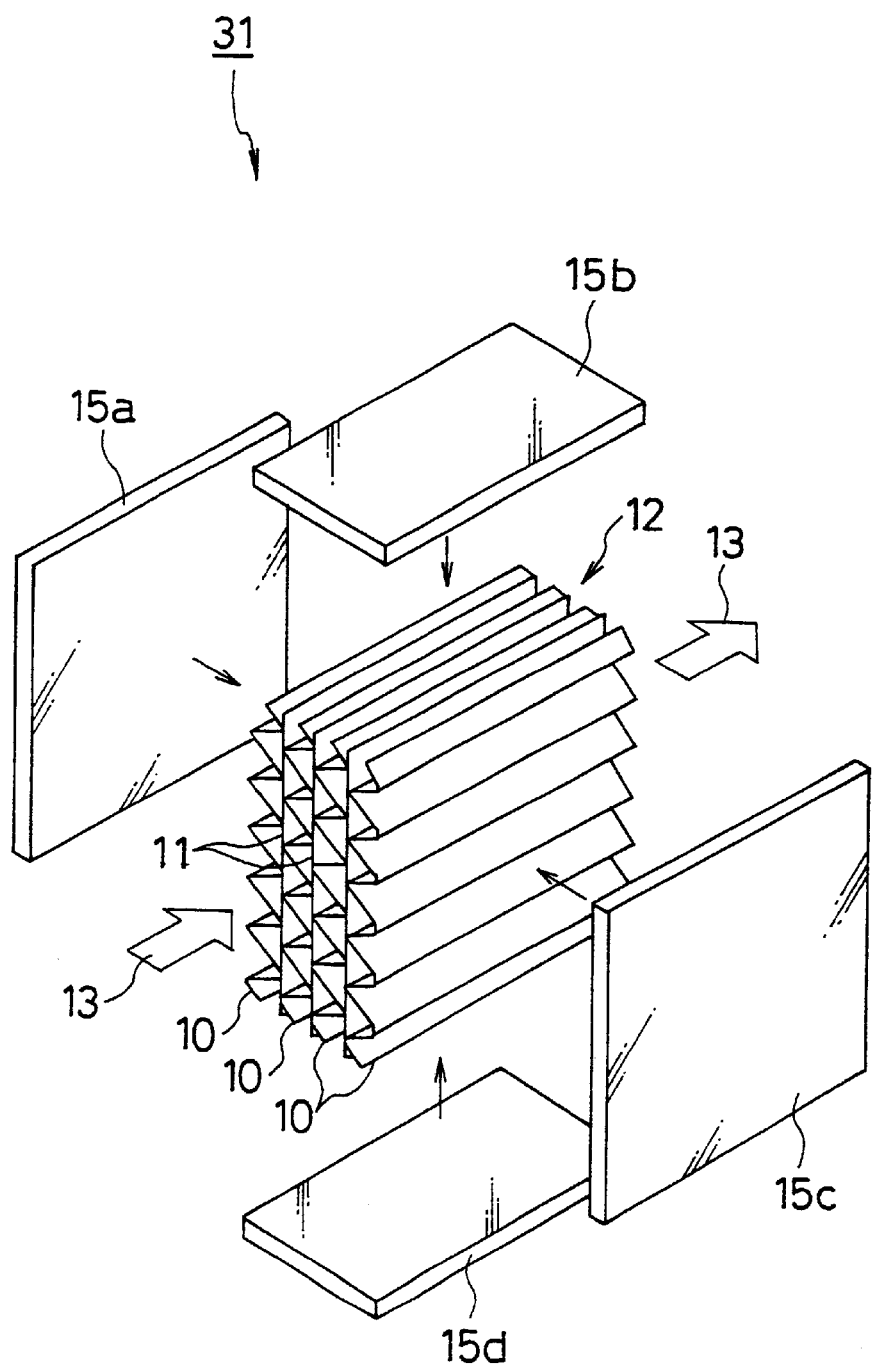
FIG. 6 is a schematic exploded view of a filter according to another embodiment of the invention.

FIG. 6 is a schematic exploded view of a filter 31 relating to another embodiment of the present invention. In the filter 31, since the structure of the honeycomb structure 12 is identical with the structure of the filter 1 explained with FIG. 1, the same reference symbols and numbers are attached in FIG. 6 for the same constituents so that the repeated details are omitted.

Figure 7:
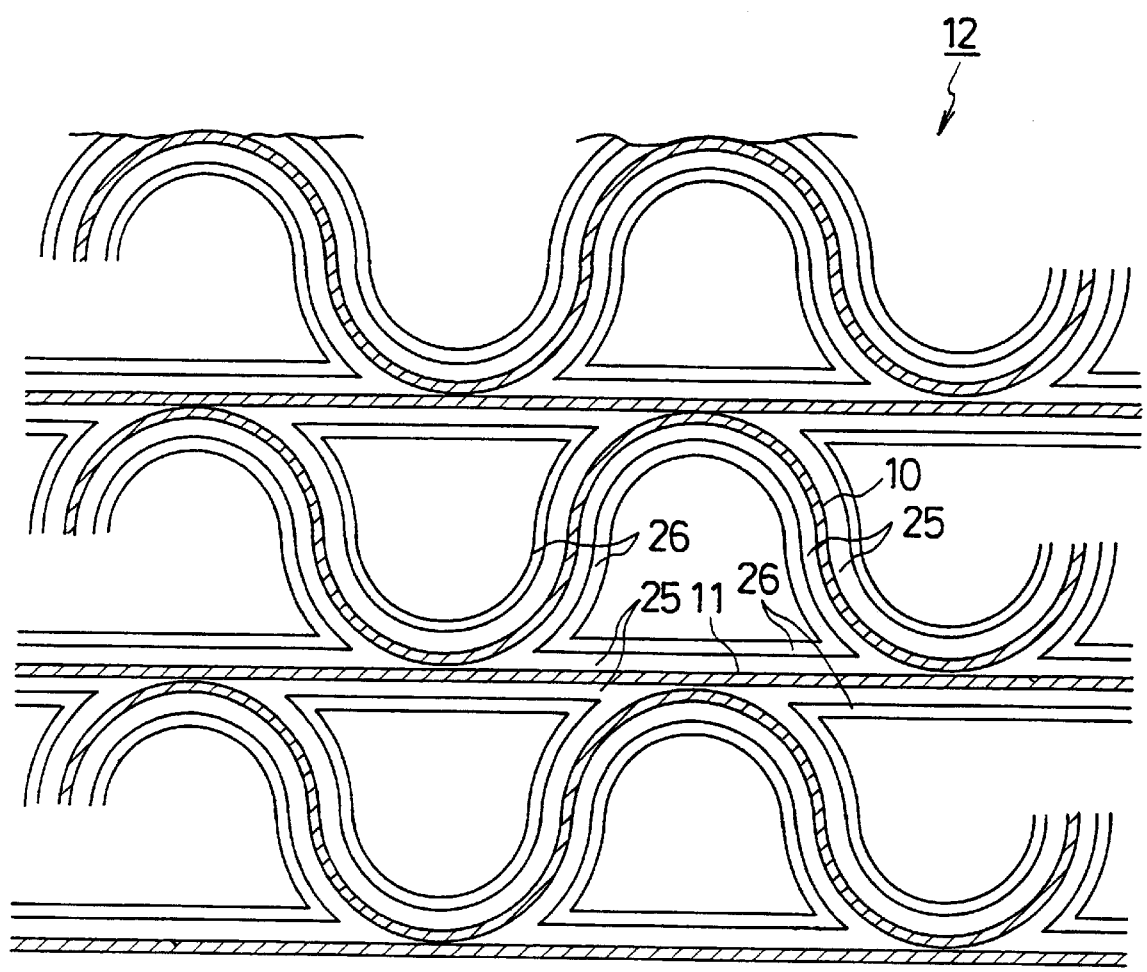
FIG. 7 is a partly enlarged sectional view of a filter including a honeycomb structure formed by alternately stacking a plurality of corrugated sheets and thin flat sheets, a first inorganic material layer that is formed by fixing powder of the inorganic substance impregnated with the salt of the inorganic acid to the surface of the honeycomb structure, using an inorganic binder, and a second inorganic material layer that is formed by fixing the inorganic adsorptive powder to the surface of the first inorganic material layer.

In the filter 31, a first adsorptive layer 25 (namely, the first inorganic material layer) is formed by fixing powder of the adsorbent with an inorganic binder on the surface of a honeycomb structure 12 formed by alternately stacking a plurality of corrugated sheet 10 and thin flat sheet 11, and a second adsorptive layer 26 (namely, the second inorganic material layer) is formed by fixing powder of an inorganic substance having an effective pore diameter in the range of the mesopore or micropore on the surface thereof, as shown in FIG. 7. Hereinafter, the inorganic powder having an effective pore diameter in the range of the mesopore or micropore is called "inorganic adsorptive powder". The outer shape and dimension of the filter 31 may be freely designed to correspond the space available for installation. The effective pore diameter of the inorganic binder for use in the formation of the first inorganic material layer 25 may be different from that of the inorganic adsorptive powder used for forming the second inorganic material layer 26, and may be in the range of macropore having no contribution to physical adsorption.

For instance, clay minerals such as talc, kaolin mineral, and bentonite as shown in the group (II) of Table 5, hardly include pores contributing to physical adsorption, but they may be used as the inorganic binder for the first adsorptive layer 25. Also, inorganic adhesion assisting agents such as sodium silicate, silica, and alumina may be used for the same purpose. It should be noted that silica sol may be used as silica while alumina sol may be used as alumina. Silica sol or alumina sol which is a suspension including mono-dispersed primary particles with a size of a nanometer to several tens nanometers, transforms into a three-dimensional aggregate silica gel or alumina gel as an ensemble of primary particles if it is fixed to the supporter surface and then dried, making it capable of adsorbing gaseous organic impurities.

Figure 8:
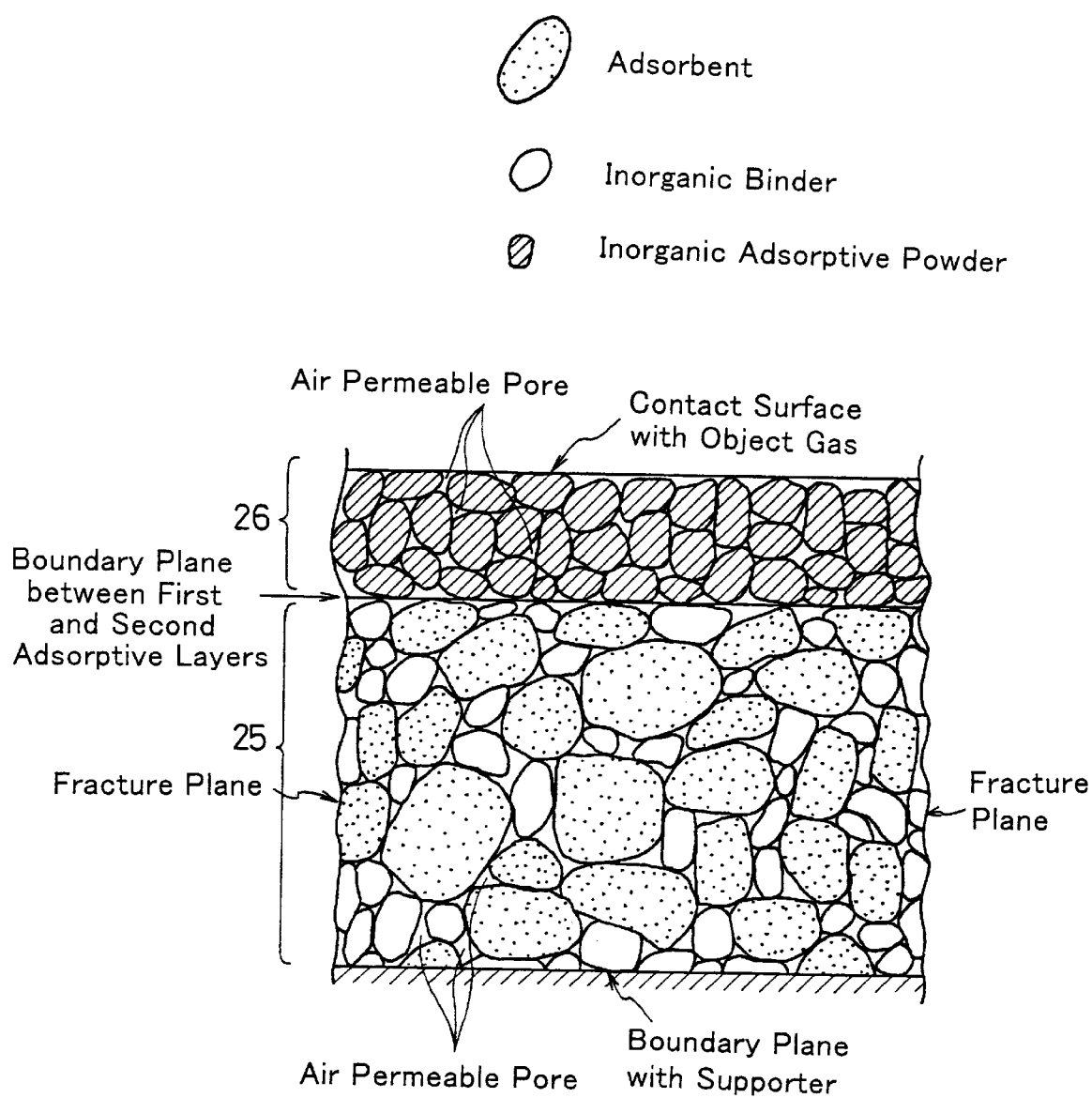
FIG. 8 is a partly enlarged sectional view of a complex layer including the first and second adsorptive layers.

In this regard, an inorganic adhesion assisting agent such as silica sol and alumina sol may be solely used in the same manner as silica gel and alumina gel are used for the binder to adsorb gaseous organic impurities of the first adsorptive layer 25, or it can be used in the same manner as silica gel and alumina gel used as the inorganic substance to adsorb gaseous organic impurities of the second adsorptive layer 26. That is to say, the first adsorptive layer 25 is required to remove gaseous basic impurities in the atmosphere, and the second adsorptive layer 26 is required to adsorb and remove gaseous organic impurities. FIG. 8 is a partly enlarged sectional view of a complex layer comprising the first and second adsorptive layers.

As shown in FIG. 8, the second adsorptive layer 26 has the capability to adsorb and remove gaseous organic impurities, so that even though the supporter is constructed including some organic materials, there is no chance for the gaseous organic impurities as desorbed therefrom to penetrate through the second adsorptive layer 26 and to be mixed with the once cleaned object air on the downstream side thereof.

Now, an example of a method for manufacturing the filter 31 will be explained. First, a porous honeycomb structure 12 is manufactured. Up to the formation of an inorganic material layer, all the manufacturing steps are carried out in the same manner as explained before, and the explanation thereof will be omitted. Next, the honeycomb structure 12 is immersed for several minutes in a suspension in which powder of the adsorbent, and an inorganic binder such as talc, kaolin mineral, and bentonite are dispersed. After this process of immersion, the honeycomb structure 12 is treated by heat at about 200° C. for about one hour, thereby forming the first adsorptive layer 25.

Next, the honeycomb structure 12 having formed the first adsorptive layer (namely, the first inorganic material layer) 25 is immersed for several minutes in a suspension in which powder of inorganic substance (inorganic adsorptive powder) having an effective pore diameter in the range of the mesopore or micropore, for instance, diatom earth, silica, alumina, a mixture of silica and alumina, aluminum silicate, activated alumina, porous glass, hydrated magnesium silicate clay mineral having a crystal structure of the ribbon type, activated clay, activated bentonite or synthetic zeolite, is dispersed. After this process of immersion, the honeycomb structure 12 is treated by heat at about 200° C. for about one hour, thereby forming the second adsorptive layer (namely, the second inorganic material layer) 26. Silica gel may be used as silica, while alumina gel may be used as alumina. Similarly, the mixed gel consisting silica gel and alumina gel may be used as the mixture of silica and alumina.

Sepiolite and p-alygorskite are used as a hydrated magnesium silicate clay mineral having a crystal structure of the ribbon type used for forming the second adsorptive layer 26. Thus, the honeycomb structure 12 in which the second adsorptive layer 26 is coated on the first adsorptive layer 25 can be obtained. In powder of the inorganic substance used for forming the first adsorptive layer 25 and the second adsorptive layer 26, at least one inorganic adhesion assisting agent, such as sodium silicate, silica and alumina, may be mixed. It should be noted that silica sol may be used as silica and alumina sol may be used as alumina.

The inorganic adhesion assisting agent plays a role of firmly fixing powder of the adsorbent and the inorganic binder forming the first adsorptive layer 25 as a first inorganic material layer to the pores of the honeycomb structure 12, or another role of firmly fixing the inorganic adsorptive powder forming the. second adsorptive layer 26 as a second inorganic material layer to the first adsorptive layer 25.

The method for adding the salt of the inorganic acid contained in the filter 31 of the present invention is the same as that described before. One of such methods is to dissolve the salt of the inorganic acid in a suspension for forming the first inorganic material layer or the second inorganic material layer, in other words, a suspension in which powder of the adsorbent, the inorganic binder, the inorganic adsorptive powder, the inorganic adhesion assisting agent and so forth are mixed. Another method is to immerse the honeycomb structure in a solution of the salt of the inorganic acid after forming the first inorganic material layer and the second inorganic material layer, and to dry again by heat treatment.

The honeycomb structure 12 thus obtained neither includes any flammable material as its constituent, nor desorbs any of gaseous organic impurities causing surface contamination of the product because such materials or impurities are completely removed from materials constituting the filter during the above-mention heat treatment. The honeycomb structure 12 itself never desorbs gaseous organic impurities. In addition, it is preferable to use such material as aluminum, which neither desorb any gaseous organic impurities nor includes any flammable material, for the material of the outer frame 15 shown in FIG. 6.

It is also preferable for an adhesive and a sealant, which are used for fixing the honeycomb structure 12 to the outer frame 15 or filling the gap between the honeycomb structure 12 and the outer frame 15, to have characteristics of neither generating gaseous organic substances nor containing any flammable substances. In this case, for instance, the entire filter 31, in which the assembling is finished by fixing the outer frame 15 to the honeycomb structure 12, may be treated by heat to completely desorb and remove gaseous organic impurities causing surface contamination from the flammable adhesive and the sealant which are constituents of the filter 31. Thus, the entire filter 31 can be constituted from materials which do not contain any flammable substance or from materials which do not generate any gaseous organic impurities.

Still other example of a method for manufacturing the filter 31 will now be described. In this example, the honeycomb structure 12, manufactured by the above-mentioned method, or the three-dimensional mesh structure such as rock wool is utilized as a supporter. The pellets made out of the adsorbent are fixed to the surface of such supporter with an adhesive. The pellets made out of the adsorbent used during the course of the above method, are prepared by mixing powder of adsorbent to the inorganic binder and pelletizing the mixture.

The pellet coated with powder of an inorganic substance (inorganic adsorptive powder) having an effective pore diameter in the range of mesopore or micropore, is prepared in advance. The method for manufacturing the pellet is that in order to form a coating layer of the inorganic adsorptive powder, the above pellet formed out of the inorganic adsorptive powder is first dipped in a suspension in which the inorganic adsorptive powder for use in coating is dispersed, then taken out from the suspension and dried. In order to increase the mechanical strength of the coating, the above suspension may contain an inorganic adhesion assisting agent in the sol state with the inorganic adsorptive powder for use in coating, so that the resultant coating comes to include both of the inorganic adsorptive powder and the inorganic adhesion assisting agent. The types of the inorganic adsorptive powder and the inorganic adhesion assisting agent for use in coating, may be selected as previously mentioned.

Figure 9:
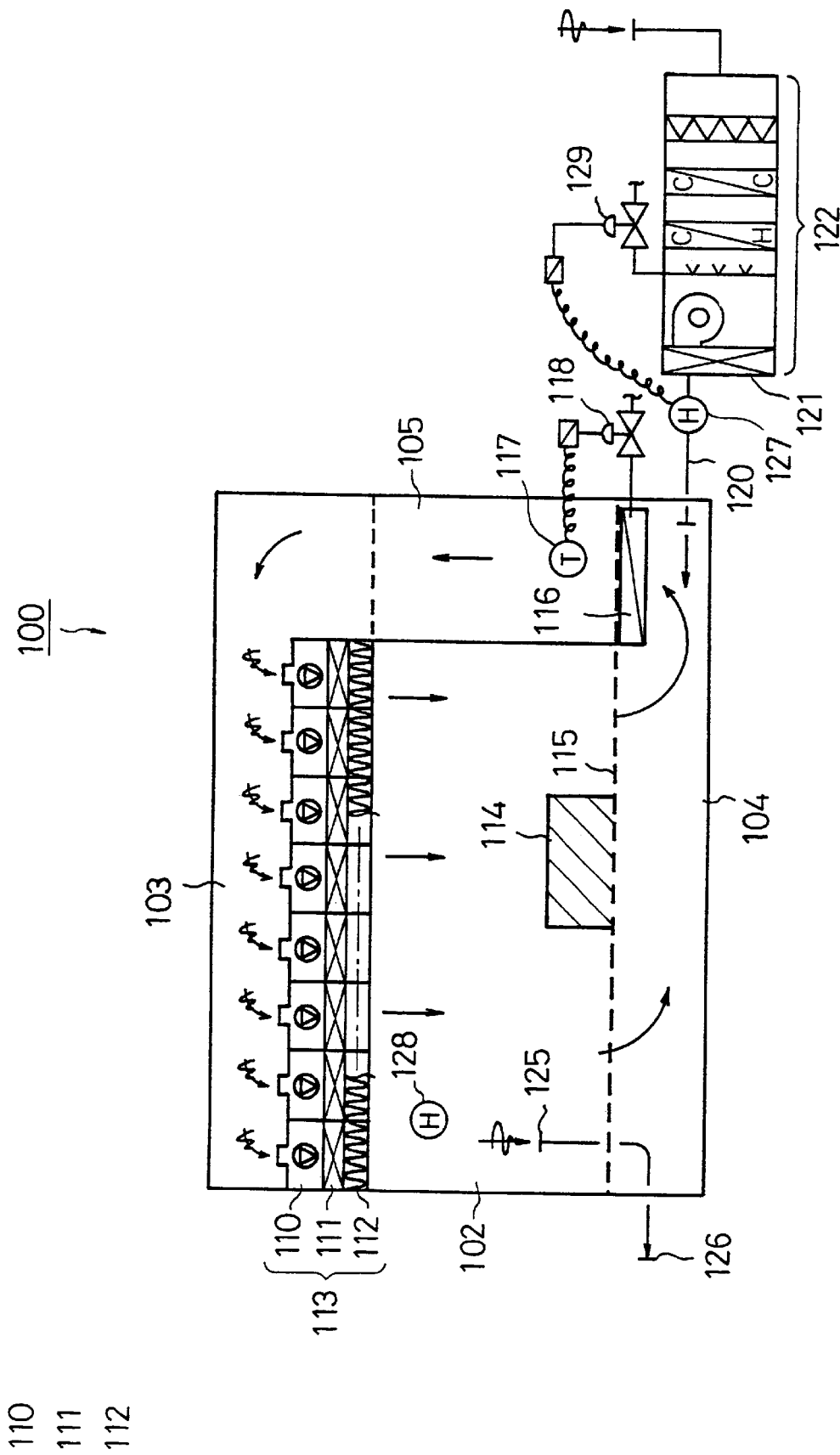
FIG. 9 is a schematic illustration for explaining a high efficiency air cleaning apparatus according to an embodiment of the invention.

A high efficiency air cleaning apparatus related to the embodiment of the present invention will now be described. FIG. 9 is a schematic illustration for explaining a high efficiency air cleaning apparatus 100 constructed according to an embodiment of the invention. Such high efficiency air cleaning apparatus includes a clean room and a clean bench. The high efficiency air cleaning apparatus 100 includes a working space 102 in which precise and delicate products such as LSI's and LCD's can be processed, a ceiling portion (supply plenum) 103 and an under-floor portion (return plenum) 104, which are respectively located at the top and the bottom of the working space 102, and a return path 105 located on the side of the working space 102.

Onto the ceiling portion 103 is arranged a clean fan unit 113 which is provided with a fan unit 110, a filter 111 with good vent for removal of gaseous impurities, and a particulate filter 112. A semiconductor manufacturing apparatus 114 is installed in the working space 102 and acts as a kind of a heat source. The under-floor portion 104 is partitioned off with grated panels 115 having a number of holes or perforations. A condensation coil of the non-dew type 116 is installed in the under-floor portion 104 in -order to deal with the heat load caused by the semiconductor manufacturing apparatus 114. The non-dew type condensation coil 116 means an air cooler which enables the air to be cooled without causing any dew condensation on the surface of a heat exchanger. A temperature sensor 117 is set up in the return path 105 to detect the temperature therein. The cooling water flow regulating valve 118 of the non-dew type condensation coil 116 is controlled so that the temperature detected by the sensor 117 is kept at a predetermined level.

By operating the fan unit 110 in the clean fan unit 113, the air in the clean room 100 begins to circulate at a properly regulated air flow rate in the following order: ceiling portion 103—working space 102—under-floor portion 104—return path 105—ceiling portion 103. While the air is circulated through the clean room in such an order, the air is cooled by means of the non-dew type condensation coil 116, and gaseous impurities and particulate impurities contained in the circulating air are removed by the filter 111 for removing gaseous impurities and particulate filter 112 which are provided in the clean fan unit 113, thereby the clean air having a suitably controlled temperature being continuously supplied to the working space 102.

The filter 111 for removal of gaseous impurities is an air filter which contains powder of the adsorbent fixed with the salt of the inorganic acid according to the present invention previously explained. And the filter 111 can remove gaseous basic impurities and even gaseous organic impurities if any, contained in the air circulating. This filter 111 is constituted only with material which neither includes any flammable material as the constituent, nor desorbs any of gaseous organic impurities.

The particulate filter 112 is disposed on the downstream side of the air filter 111 and removes particulate impurities. The particulate filter 112 is constituted with material which causes no desorption of gaseous organic impurities.

The outdoor air is properly supplied to the under-floor portion 104 of the high efficiency air cleaning apparatus 100 through an outdoor air introducing path 120. The outdoor introducing path 120 is also provided with the filter 121 of the invention for removing gaseous impurities contained in the outdoor air. A unit type air conditioner 122 is disposed upstream the air filter 121 for the purpose of removing dusts and airborne particulates in the introduced outdoor air and controlling the temperature and humidity of the outdoor air. A humidity sensor 127 is set up on the outdoor air introducing path 120. A water supply pressure regulating valve 129, which is located in the humidity control portion of the unit type air conditioner 122, is controlled in such a way that the humidity detected by the sensor 127 is kept at a preset value. On the other hand, there is provided in the working space 102 another humidity sensor 128 for detecting the humidity of the atmosphere in the working space 102.

The outdoor air supplied to the under-floor portion 104 of the high efficiency air cleaning apparatus 100 through the outdoor air introducing path 120, is led to the working space 102 via the return path 105 and the ceiling portion 103. Then, the air in an amount corresponding to the amount of the air introduced from the outside, is exhausted from an exhaust opening 125 through a return grill 126.

Since the filter 111 of the invention includes no flammable constituent, the safety from the disaster prevention standpoint, is remarkably improved even if the filter 111 is installed to cover the entire surface of the ceiling portion of the clean room as shown in FIG. 9, when compared with the case where the conventional chemical filter, which employs the flammable material such as activated charcoal and ion exchange fiber, is installed. Furthermore, in the high efficiency air cleaning apparatus 100, if the filter 121 (FIG. 9) for cleaning the introduced outdoor air is constituted in the same way as the filter 111, the safety from the disaster prevention standpoint is further improved in comparison with case where the conventional chemical filter which is constituted based on the flammable material such as activated charcoal and ion exchange fiber, is used.

An ordinary particulate filter such as a medium efficiency air filter, a HEPA filter, and an ULPA filter,. generally uses fibrous filter media containing a binder which includes some volatile organic substances, and a sealing material which is used for fixing the filter media to the filter frame and contains some volatile organic substances. Therefore, desorption of gaseous organic impurities breaks out from the filter media and/or the adhesive. Accordingly, as to the particulate filter 112 of the present invention, it is preferable to employ the filter media which uses no binder containing a volatile organic substance as a binder for a filter media. Should only the filter media including such binder be available, it is preferable to pretreat it by heat to remove volatile organic substances therefrom. Furthermore, as to the sealing material for fixing the filter media to the filter frame, the same attention is to be paid in selection thereof. Furthermore, it is preferable either to select a sealing material which includes no volatile organic substance, or to employ such an air-tight pressure contact, which provides the seal between the filter media and the filter frame by means of a physical or mechanical means, instead of using a sealing material having the possibility of desorbing organic impurities.

Figure 10:
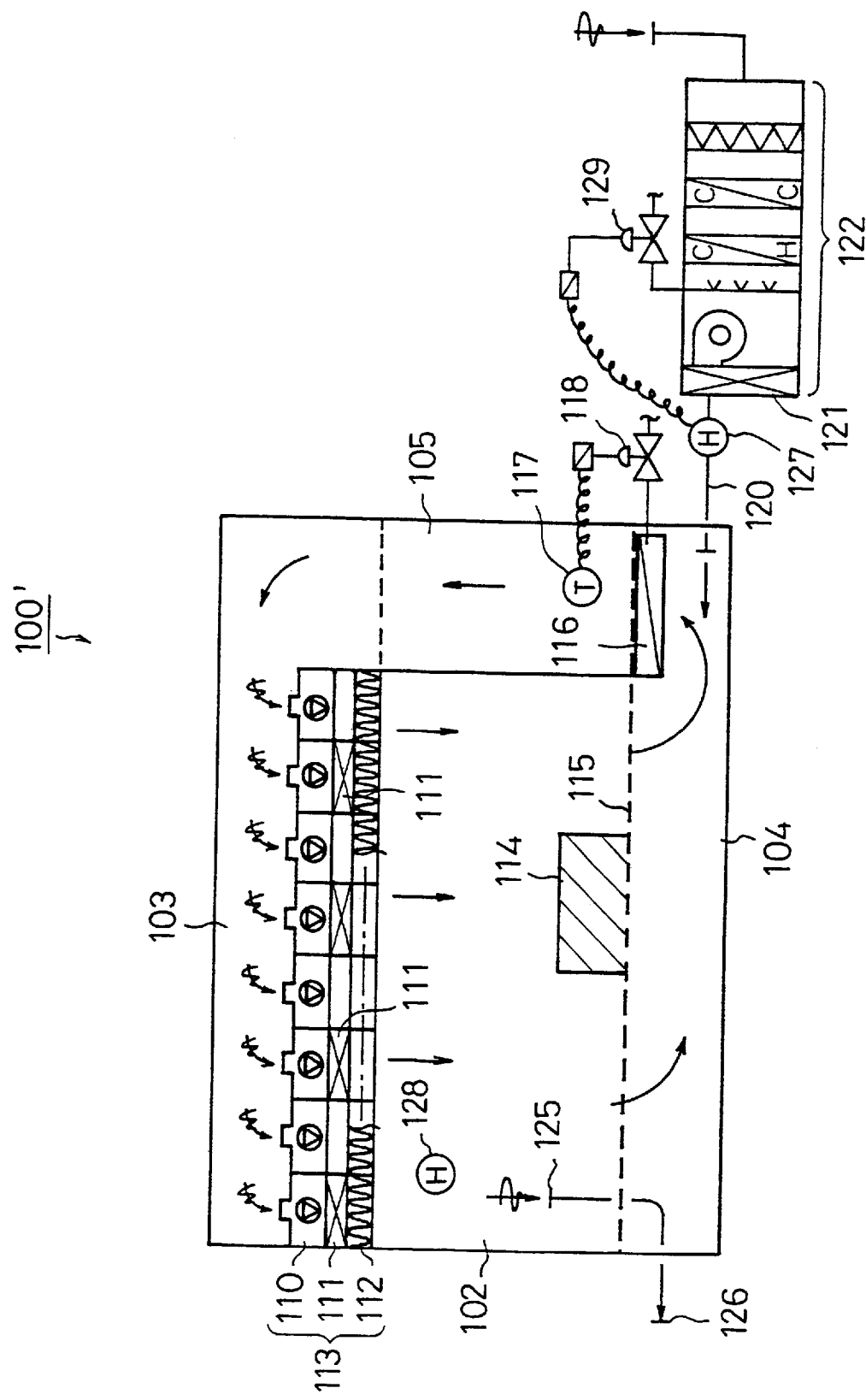
FIG. 10 is a schematic illustration for explaining a high efficiency air cleaning apparatus according to another embodiment of the invention.

FIG. 10 is a diagrammatic representation of a high efficiency air cleaning apparatus 100' according to the other embodiment of the invention. The filter 111 used in this embodiment has a honeycomb structure which includes powder of the adsorbent fixed with the salt of the inorganic acid. In this example, however, the filter 111 is installed onto the ceiling portion 103 of the high efficiency air cleaning apparatus 100' to cover the ceiling portion 103 only partly. Consequently, the number of filters used in this example is reduced to a half of that of filters used in the high efficiency air cleaning apparatus 100 as shown in FIG. 9. Except the number of filters, there is no difference between both high efficiency air cleaning apparatus 100 and 100' as shown in FIGS. 9 and 10. Therefore, corresponding parts of two high efficiency air cleaning apparatuses are designated with the same reference numerals, and detailed explanation of the corresponding parts will not be repeated.

Chemical contaminants which the air cleaning filter of the present invention is trying to remove, are basic substances, and organic substances. Typical troubles are as follows. Basic gas causes resolution failure of resist. Attachment of gaseous organic substances to the substrate surface causes defect of insulating silicon dioxide film, adhering defect of resist film, and increase in electrical resistance of the substrate surface, which sometimes results in electrostatic adsorption of particlulates. In addition, gaseous organic substance causes blur of lens and mirror on an optical stepper. A washing device, workers, and constitutional members of the clean room, existing in the high efficiency air cleaning apparatus, more or less play a role of a gaseous impurity source inside the high efficiency air cleaning apparatus. Furthermore, the outdoor air introduced to the clean room may play a role of an external contaminant source because contaminants are contained therein.

Accordingly, the main role of the filter 111 is to remove gaseous contaminants generated in the high efficiency air cleaning apparatus from the air circulating therethrough, thereby reducing the concentration of gaseous contaminants. On the other hand, the role of the filter 121 disposed on the outdoor air introducing path 120 is to remove gaseous contaminants contained in the outdoor air, thereby reducing the concentration of such gaseous contaminants in the high efficiency air cleaning apparatus. When the operation of the high efficiency air cleaning apparatus provided with the air filters 111 and 121 is started, the initial concentration of chemical contaminants in the apparatus is at a maximum value. It gradually decreases with the passage of time, due to step by step removal of the chemical contaminants in the circulating air, and finally it is stabilized when removal and generation of the chemical contaminants come to equilibrium. The ratio of the amount of chemical contaminants removed per a single air cycle by the high efficiency air cleaning apparatus 100, installed onto the entire surface of the ceiling portion, and the amount removed by the air cleaning apparatus 100', partly installed onto the ceiling portion, is 2:1.

It should be noted that the high efficiency air cleaning apparatus 100' (FIG. 10) of which the ceiling portion is covered only partly by the filter 111, takes a considerably longer time before coming to the equilibrium in comparison with the high efficiency air cleaning apparatus 100 (FIG. 9) of which the ceiling portion is entirely covered by the filter 111. Furthermore, in the case of the high efficiency air cleaning apparatus 100', the equilibrium concentration that it can reach finally, might be higher than the level that the high efficiency air cleaning apparatus 100 can achieve. Reducing the number of the filters has disadvantages in terms of time and the concentration level of contaminants finally reached. In terms of economy, however, it is convenient to reduce the number of the filters 111 as shown in FIG. 10, for this practice will lighten the burden of the initial cost and the running cost needed to maintain the apparatus.

Next, the function and effect of the filter according to the invention will be explained by way of examples.

To comparatively study the performance of filters, the clean room air is filtered by using different kinds of filters, and cleanliness thereof is evaluated by measuring, with the passage of time, the change regarding the contact angle between a silicon dioxide film formed on a silicon wafer and a water droplet dropped thereon. To be more specific, the four different clean room air to be evaluated is prepared: the first and second one prepared by filtering the clean room air, using two kinds of commercial chemical filters, one including powder of activated charcoal impregnated with a chemical effective for removing gaseous basic impurities, and the other including fibrous activated charcoal also impregnated with solid chemical; third one prepared by filtering the clean room air using a chemical filter including ion exchange fiber; and fourth one prepared by filtering the clean room air, using the filter of the invention as shown in FIG. 6.

Figure 11:
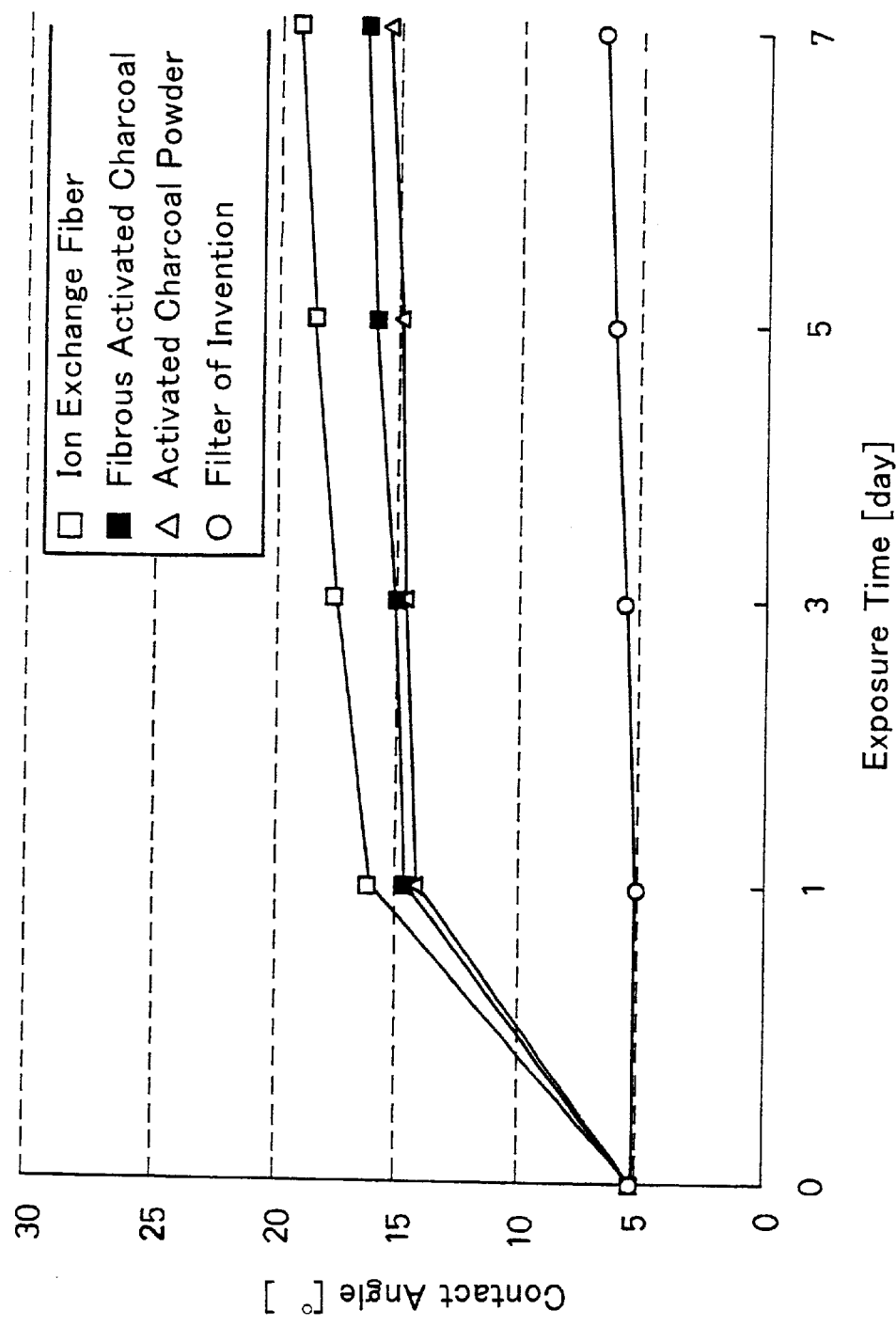
FIG. 11 is a graphical illustration showing the contact angle change with the passage of time with regard to a silicon wafer having a silicon dioxide surface when it is exposed to four kinds of clean room atmospheres i.e. the first and second atmospheres being respectively filtered by two different kinds of commercial chemical filters, the third being filtered by a chemical filter using ion exchange fiber, and the fourth being filtered by an air filter according to the invention.

FIG. 11 is a graphical illustration showing the results of the above evaluation on cleanliness of the clean room air. The value of the contact angle is obtained by measuring a pure water droplet dropped on the substrate surface. This contact angle may be used as an index, by which the degree of organic contamination of the substrate surface can be determined with ease. If the silicon dioxide film and a glass plate are made free from any organic contaminant immediately after rinsing them, their surfaces have affinity for water. In other words, they become hydrophilic, thus making a small contact angle. Contrary to this, if their surfaces are once contaminated with organic substances, they come to shed water. In other words, they become hydrophobic, thus making a large contact angle.

Figure 12:
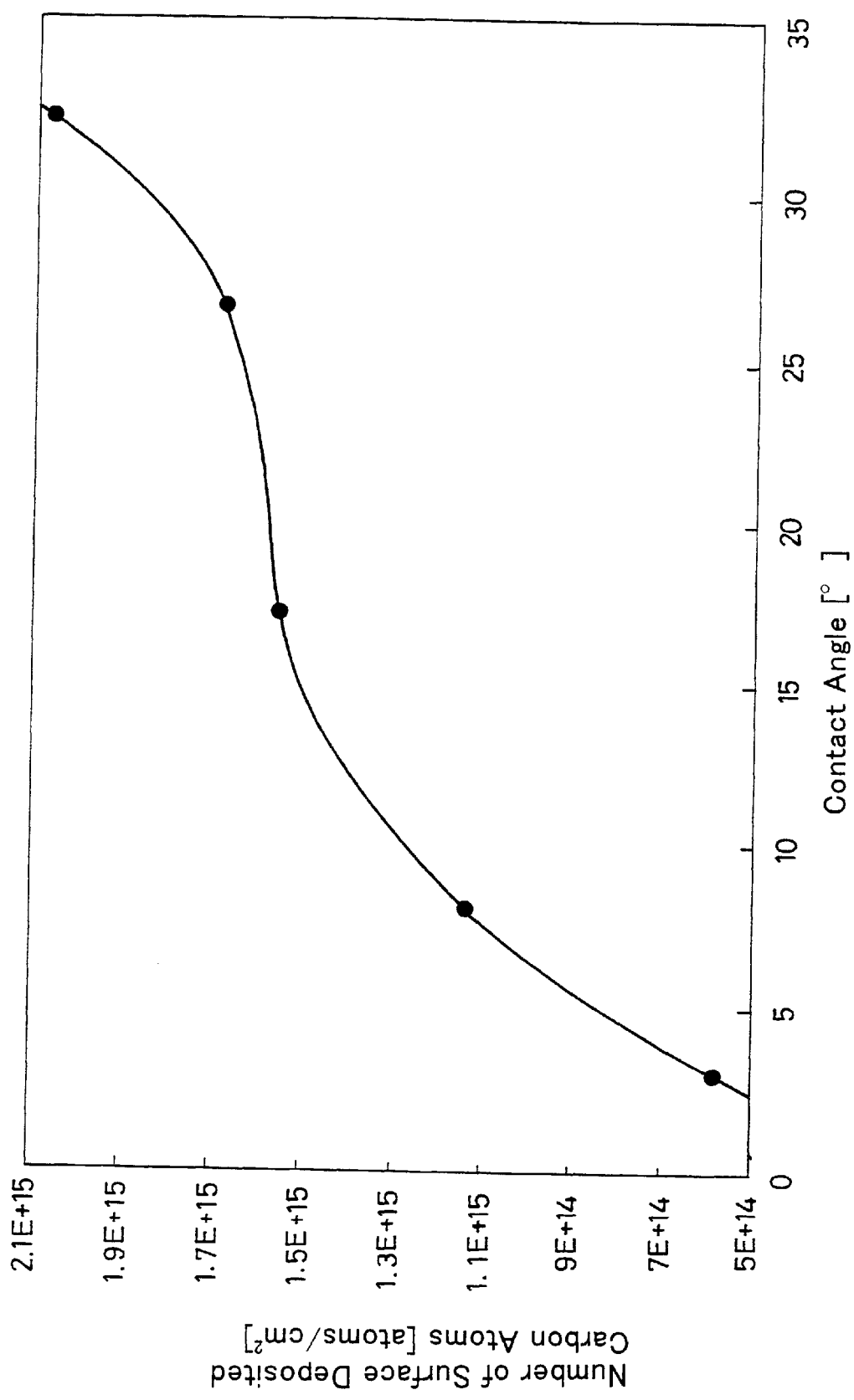
FIG. 12 is a graphical illustration showing a correlation between the contact angle measured by a method of dropping ultra pure water droplet and the surface contamination by organic substances measured by the X-ray photo electron spectroscopy (XPS), with regard to the glass substrate exposed to the clean room atmosphere.

When a glass plate is left in the clean room air and a contact angle between its surface and a very much purified water droplet dropped thereon with the passage of time is measured, it is known that there exists a certain mutual relation as shown in FIG. 12 between the contact angle measured by the water droplet method and the degree of surface contamination measured by the XPS (X-ray photoelectron spectroscopy) method. With regard to the silicon dioxide film formed on a silicon wafer, similar mutual relation exists between the contact angle and the surface contamination by organic impurities. There exists a very strong mutual relation between the water contact angle on the substrate surface and the surface contamination by the organic substance.

The following can be understood from the measurement results as shown in FIG. 11. The ion exchange fiber, primarily used for adsorbing and removing water-soluble inorganic impurities, can not adsorb any organic substance in the air to be cleaned. It even desorbs gaseous organic substances. Consequently, when a test piece (silicon wafer covered with a silicon dioxide film) is left all day in the clean room air filtered by the ion exchange fiber filter, the contact angle is increased by about 100. Two kinds of activated charcoal filters are used for primarily preventing the contamination by gaseous inorganic impurities, but they also fail to adsorb organic substances contained in the object air. On the contrary, since even the activated charcoal filter itself desorbs gaseous organic substances, the contact angle is found to increase by about 10° when the test piece is left in the clean room air filtered thereby for a day. On the other hand, no significant change is seen regarding the contact angle after keeping the test piece all day long in the clean room air filtered by the filter of the invention as shown in FIG. 6. This means that the gaseous organic substance contained in the object air is adsorbed and removed by the filter of the invention, and also that the filter itself desorbs no gaseous organic substance.

In the case of the activated charcoal filter, gaseous organic impurities are desorbed from its constituent materials of the filter such as a filter media, an adhesive for fixing activated charcoal to the filter media sheet, a sealing material for fixing the filter media to the frame. On the other hand, in the case of the ion exchange fiber filter, gaseous organic impurities are desorbed from various additives included in the high-molecular fiber forming the filter. These gaseous organic impurities are easily mixed up with the air once cleaned by passing through the chemical filter. Furthermore, in the case of the ion exchange fiber filter, it sometimes happens that a part of the ion exchange base is desorbed in the form of sulfonic acid, carboxylic acid, and phosphoric acid.

That means these prior art chemical filters allow desorption of gaseous organic impurities, and such impurities are mixed up with the air once cleaned by the filter even if such prior art filters succeed in removal of the basic impurities of ppb order while the clean room air passes through them. Therefore, as to the expected value of gaseous impurity control by the US SEMATECH listed in Table 1, the chemical filter for removing these conventional gaseous basic impurities is able to satisfy the concentration standard for the gaseous basic impurities but it sometimes fails to satisfy the concentration standard for the gaseous organic impurities. Furthermore, there is possibility that the prior art chemical filter might even increase the concentration of gaseous organic impurities in the clean room air.

Performance of two kinds of filters according to the invention, one including a honeycomb structure (a) (referred to as "filter (a)" hereinafter) and the other including a honeycomb structure (b) (referred to as "filter (b)" hereinafter), which will be described later, is evaluated by having them filter the clean room air containing $NH_3$, DOP, and decamethyl cyclopenta siloxane ($D_5$), each of which has a different concentration in the range of several hundred ppt to several ppb. The protection efficiency against $NH_3$ of each filter is evaluated based on the measurement of their concentration on both upstream and downstream sides of the honeycomb structure with the help of an ion chromatograph (IC). The protection efficiency against the organic surface contaminants of each filter is also evaluated based on the measurement of the quantity of DOP and $D_5$ deposited on the surface of a silicon wafer, which is placed one each on both upstream and downstream sides of the honeycomb structure. Furthermore, the concentration of airborne particulates (the number of particulates with a diameter of 0.1 micrometers or more contained in the air of 1 $ft^3$) is measured on the downstream side of the honeycomb structure, wherein the number of airborne particulates is $10/ft^3$ on the upstream side of the honeycomb structure. Table 7 indicates the results obtained by the above-mentioned measurements.

TABLE 7

| | Contaminant | Filter (a) | Filter (b) |
|---|---|---|---|
| Protection Efficiency | $NH_3$ | 93% | 97% |
| | DOP | ≥99% | 75% |
| | $D_5$ | 92% | 45% |
| Conc. of Airborne Particulate on Downstream Side: Particulate (≥0.1 micrometers) | | $10/ft^3$ | $100/ft^3$ |

For evaluation of the surface contamination, a p-type silicon wafer with a diameter of 4-inch is used as a test piece for measuring the quantity of organic surface contaminants deposited thereon. The test piece is rinsed, dried, and then exposed to the object air on both upstream and downstream sides of the filter. Measurement and analysis of organic contaminants deposited on the test piece are carried out by means of an elevated temperature gas desorption device and GC-MS (a gas chromatograph mass spectrometer) in combination. The protection efficiency against the surface contaminants of the filter is determined by means of the gas chromatograph as follows.

The protection efficiency=$(1-(B/A))\times 100$ (%)
where
A: Area of the organic contaminant peak detected on the test piece surface placed on the upstream side of the filter, and
B: Area of the organic contaminant peak detected on the test piece surface placed on the downstream side of the filter.

Each of the two kinds of filters (a) and (b) in this embodiment has a structure having thin flat sheets 11 stacked by adjacent corrugated sheets 10 as shown in FIG. 1 and FIG. 6. The air passes through the filter having a thickness of 10 cm. The air passes through the filter at a face velocity of 0.6 m/sec, and the total effective sheet area per unit filter volume capable of acting on the air that passes through the filter (i. e. effective filtration area) is 3000 $m^2/m^3$.

The filter (a) of the invention has the first and second inorganic material layers on the surface of its porous honeycomb structure. The first inorganic material layer is formed by immersing the porous honeycomb structure in a suspension and then drying it, the suspension containing powder of an adsorbent consisting of silica gel impregnated with aluminum sulfate at 42 wt % in relation to the total weight of the adsorbent and having an average particle diameter of 4 $\mu$m and powder of kaolinite (size: 3 micrometers) as an inorganic binder, and silica sol as an inorganic adhesion assisting agent.

The second inorganic material layer is formed by immersing the above porous honeycomb structure already having the first inorganic material layer in another suspension and then drying it again, the suspension containing powder of activated clay (size: 3 micrometers, effective pore diameter: 20 to 1000 angstroms), and silica sol as an inorganic adhesion assisting agent. The first inorganic material layer is formed to have a thickness of 100 micrometers, in which the weight ratio of its components is the adsorbent: kaolinite: inorganic adhesion assisting agent=65%:31%:4%. The second adsorption layer is formed to have a thickness of 10 micrometers, in which the weight ratio of its components is acid-treated montmorillonite: silica=85%:15%. The weight per unit of an entire filter is 235 g/lit., and the weight per unit of two inorganic material layers is 94 g/lit., thus the weight percentage of the two inorganic material layers corresponds to 40% of the entire filter weight.

The filter (b) of the present invention is manufactured as follows. The filter (b) also has an inorganic material layer on the surface of its porous honeycomb structure. This inorganic material layer is formed by immersing the honeycomb structure in a suspension and then drying it, the suspension containing powder of silica gel impregnated with the above-mentioned aluminum sulfate, powder of kaolinite (size:3 micrometers) as an inorganic binder, and silica sol as an inorganic adhesion assisting agent. Kaolinite used in the filter (b) has no other major effective pore than air permeable pores having a diameter of 1000 angstroms or more, and it scarcely exhibits the physical adsorption function. On the other hand, activated clay as used in the filter (a) has pores, of which the major effective pore diameter distributes in the range of 20 to 1000 angstroms, so that they may exhibit the physical adsorption function that is never inferior to that of activated charcoal.

The difference between filters (a) and (b) is that the filter (b) is provided with nothing equivalent to the second inorganic material layer (activated clay layer) of the filter (a). As will be apparent from Table 7, regarding removal of gaseous basic impurity $NH_3$, only the first inorganic material layer containing powder of silica gel impregnated with aluminum sulfate effectively works thereon, so that presence of the second inorganic material layer hardly influences the protection efficiency against gaseous $NH_3$. However, when it comes to protection of the substrate surface from DOP and decamethyl cyclopenta siloxane ($D_5$), which represent the majority of organic contaminants detected on the test piece surface, the protection efficiency is remarkably changed depending on whether there is the second inorganic material layer having the excellent physical adsorption function.

In short, the filter (a) can remove not only gaseous basic impurities but also the gaseous organic impurities at the same time. As apparent from the measurement result of the airborne particulates concentration on the downstream side shown in Table 7, the filter (a) is formed by coating the first inorganic material layer containing the adsorbent impregnated with aluminum sulfate with the second inorganic material layer (activated clay layer), thereby restraining the exfoliation from the first inorganic material layer, so that the airborne particulates concentration on the downstream side becomes $10/ft^3$ which is the same value as that of the upstream side. However, as to the filter (b), since the first inorganic material layer is kept uncovered in the air, the airborne particulate concentration becomes $100/ft^3$ which is 10 times as much as the concentration on the upstream side, due to the exfoliation from the first inorganic material layer.

Table 8 comparatively shows the performance of various filters, which are manufactured according to the invention.

TABLE 8

| Gaseous Impurity | A | B | C | D | E | F |
| --- | --- | --- | --- | --- | --- | --- |
| $NH_3$ | 95% | 95% | 92% | 90% | 95% | 95% |
| DOP | 80% | ≧99% | 98% | ≧99% | 98% | ≧99% |
| $D_5$ | 50% | 90% | 87% | 91% | 85% | 90% |

In the above Table 8, a mark "A" represents a filter including a honeycomb structure on the surface of which is provided with an inorganic material layer. This inorganic material layer is formed by fixing a mixture consisting of the adsorbent made of powder of silica gel impregnated with aluminum sulfate, kaolinite as a binder, and silica sol as an inorganic adhesion assisting agent to the honeycomb structure surface. The inorganic material layer is formed to have a thickness of 100 micrometers, in which the weight ratio of it's components is the adsorbent: kaolinite: inorganic adhesion assisting agent=70% 27%:3%.

A mark "B" stands for a filter of which the honeycomb structure is provided on its surface with an inorganic material layer. The inorganic material layer is formed by fixing a mixture consisting of the adsorbent made of powder of silica gel impregnated with aluminum sulfate, and silica sol which is an inorganic adhesion assisting agent as a binder to the honeycomb structure surface. The silica sol which is an inorganic adhesion assisting agent is a suspension including mono-dispersed primary particles with a size of a nanometer to several tens nanometers. It is once fixed to the supporter surface and then dried, and it is transformed into a three dimensional aggregate as an ensemble of primary particles, so that silica sol is transformed into silica gel capable of adsorbing gaseous organic impurities. The inorganic material layer is formed to have a thickness of 100 micrometers, in which the weight ratio of its components is the adsorbent: inorganic adhesion assisting agent=70%:30%.

A mark "C" represents a filter in which the second inorganic material layer consisting of silica gel formed by fixing and drying silica sol on the filter surface of the filter A of the present invention. The second inorganic material layer is 10 micrometers in thickness, of which component is 100% inorganic adhesion assisting agent or silica gel.

A mark "D" represents a filter in which the second inorganic material layer consisting of silica gel formed by fixing and drying the silica sol is formed on the filter surface of the filter B of the present invention. The second inorganic material layer is 10 micrometers in thickness, of which component is 100% silica gel.

A mark "E" stands for a filter in which an inorganic material layer consisting of silica gel formed by fixing and drying the silica sol is first formed on the surface of the honeycomb structure. Further, on the surface thereof, another inorganic material layer is formed by mixing powder of the adsorbent, kaolinite as a binder and silica sol or an inorganic adhesion assisting agent. In short, the order of forming the inorganic material layers of this filter E is just opposite of the order for forming layers in the filter C.

A mark "F" stands for a filter in which an inorganic material layer, consisting of silica gel formed by fixing and drying the silica sol, is first formed on the surface of the honeycomb structure. Further, on the surface thereof, another inorganic material layer is formed by mixing powder of the adsorbent, and silica sol or an inorganic adhesion assisting agent as a binder. In short, the order of forming the inorganic material layers of this filter F is just opposite of the order for filter D.

FIGS. 13 through 18 are enlarged structural views in section of inorganic material layers which are formed with respect to the above-mentioned filters A through F. Among these figures, FIG. 15 specifically includes a perspective view of a model of the first and second inorganic material layers, for better understanding of the structure thereof. These figures conceptually illustrate various pores in the inside of the cylinder, the cylinder formed by cutting out the inorganic material layer shown in FIG. 4 and FIG. 8 in a cylinder-shape, having its height equal to thickness of the inorganic material layer. In the drawings, micropores and mesopores capable of physically adsorbing gaseous organic impurities are indicated as narrow openings while macropores which hardly perform any physical adsorption of such gaseous impurities are indicated as rather wide openings.

Figure 13:
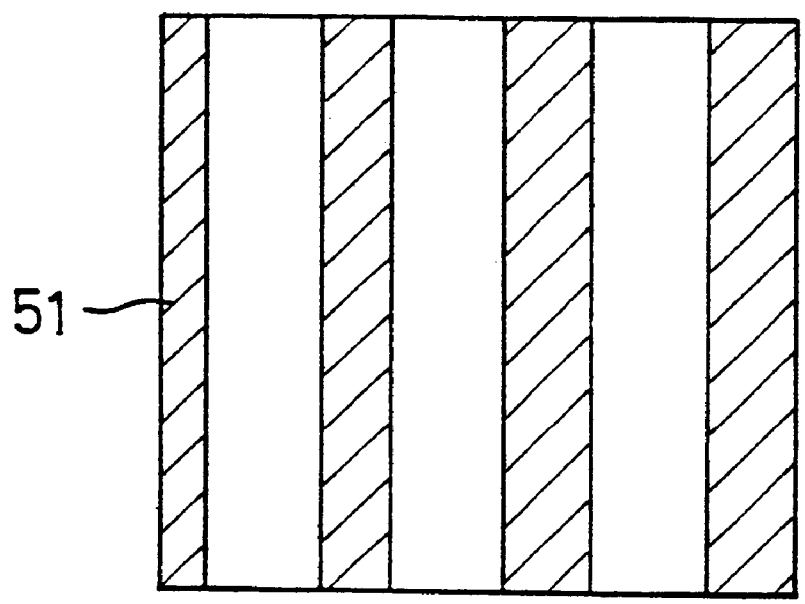
FIG. 13 is a structural view in section of an inorganic material layer according to the embodiment A of the invention.

In the case of the filter A of the present invention, as shown in FIG. 13, its inorganic material layer 51 including powder of the adsorbent consisting of silica gel impregnated with aluminum sulfate has no other effective pore than air permeable pores having a size of 1000 angstroms or more, and it hardly exhibits the physical adsorption function for gaseous organic impurities.

Figure 14:
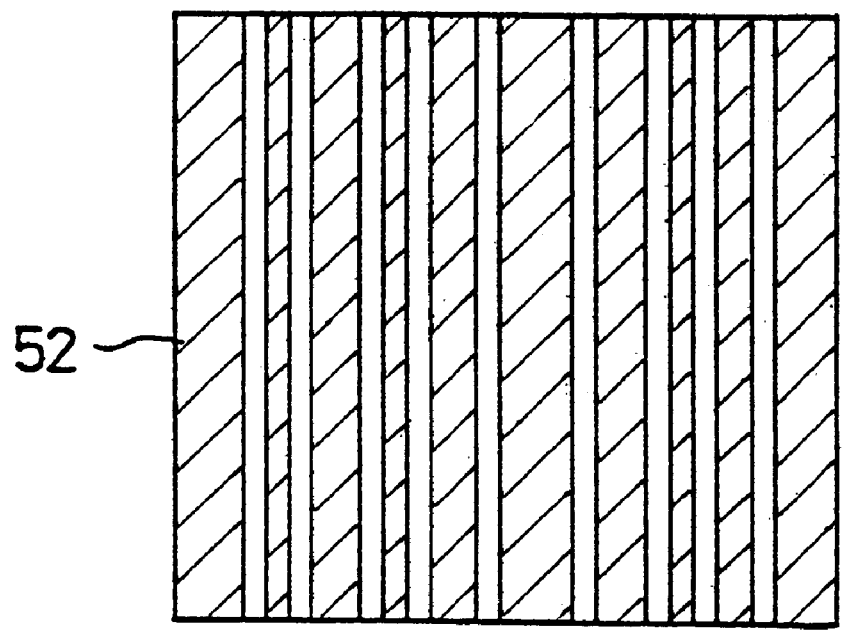
FIG. 14 is a structural view in section of an inorganic material layer according to the embodiment B of the invention.

In the case of the filter B of the invention, as shown in FIG. 14, its inorganic material layer 52 including powder of the adsorbent exhibits the physical adsorption function for gaseous organic impurities because the silica gel consisting the inorganic material layer 52 has pores having a size of 5 through 300 angstroms in the inside.

Figure 15:
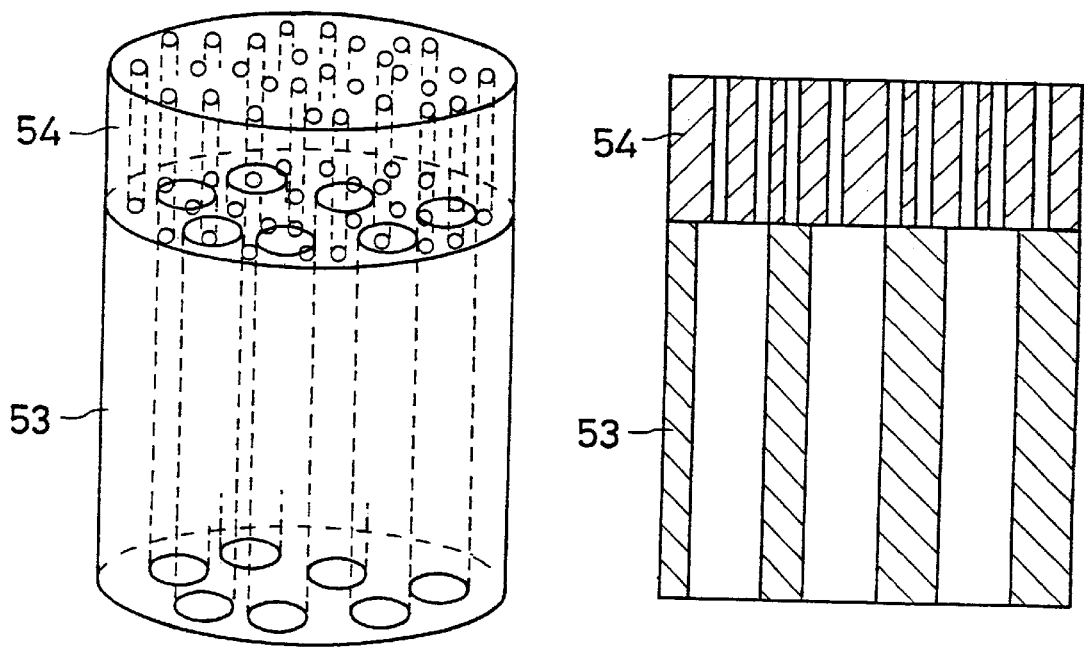
FIG. 15 is a perspective view of a model of first and second inorganic material layers and a structural view in section of the same according to the embodiment C of the invention.

In the case of the filter C of the present invention as shown in FIG. 15, its first inorganic material layer 53 including powder of the adsorbent has no other major effective pore than the air permeable pore having a size of 1000 angstroms or more, so that it hardly exhibits the a physical adsorption function for gaseous organic impurities. However, its second inorganic material layer 54 consisting of only silica gel has on its surface pores in the pore diameter range of about 5 to 300 angstroms, thereby exhibiting the physical adsorption function for gaseous organic impurities.

Figure 16:
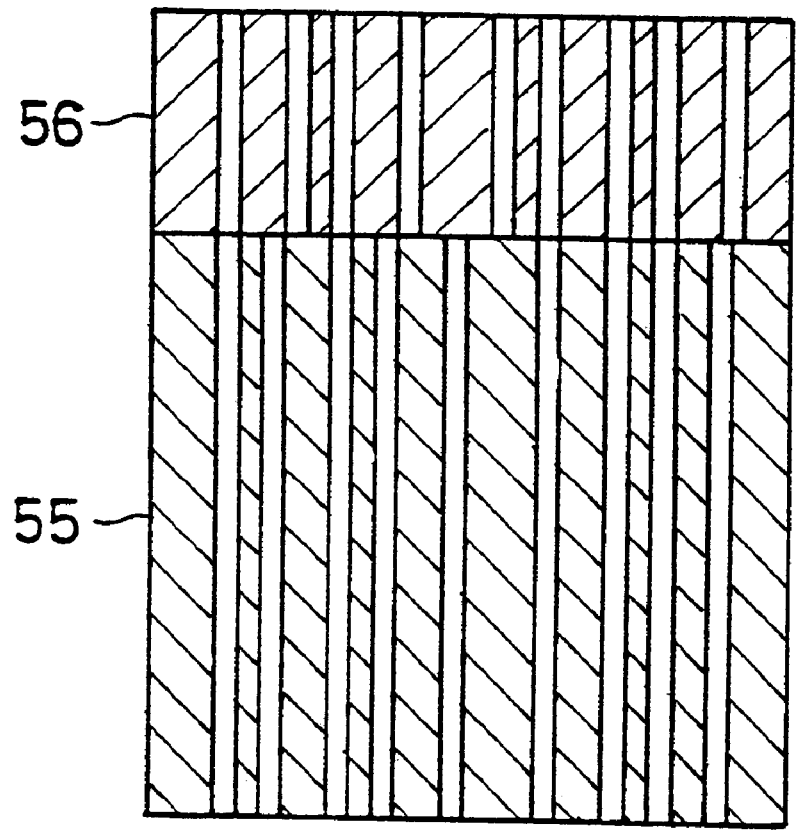
FIG. 16 is a structural view of first and second inorganic material layers in section according to the embodiment D of the invention.

In the case of the filter D, as shown in FIG. 16, its first inorganic material layers 55, including powder of the adsorbent, contains silica gel, and the second inorganic material layer 56, having no above-described adsorbent powder, consists of silica gel only. Thus both of them exhibit the function of physically adsorbing gaseous organic impurities.

Figure 17:
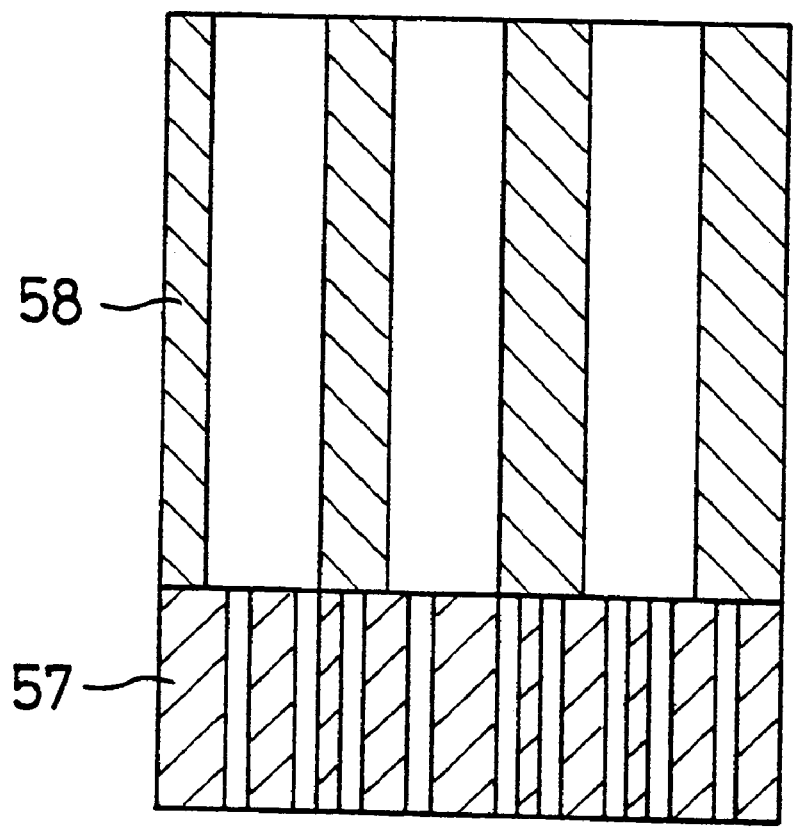
FIG. 17 is a structural view of first and second inorganic material layers in section according to the embodiment E of the invention.

In the case of the filter E, as shown in FIG. 17, its first inorganic material layer 57, having no adsorbent powder, consists of silica gel only, thus having the physical adsorption function for gaseous organic impurities. However, its second inorganic material layer 58 including the adsorbent has no other effective pore than the air permeable pore having a size of 1000 angstroms or more. Consequently, it hardly exhibits the physical adsorption function for gaseous organic impurities.

Figure 18:
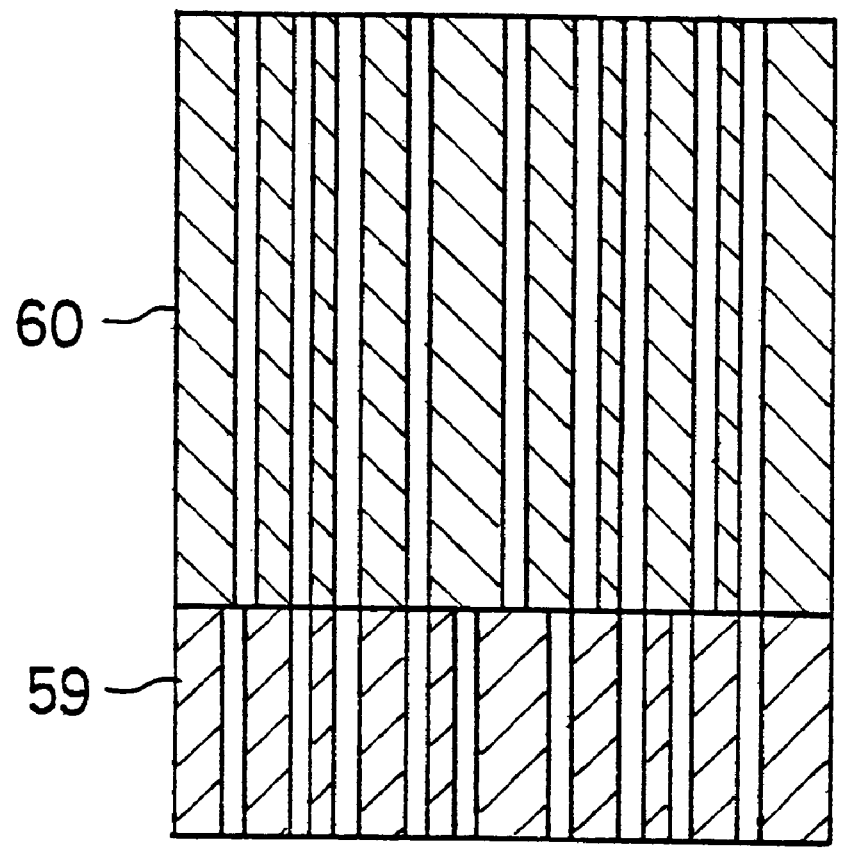
FIG. 18 is a structural view of first and second inorganic material layers in section according to the embodiment F of the invention.

In the case of the filter F, as shown in FIG. 18, its first inorganic material layers 59 without powder of the adsorbent, consists of silica gel only while the second inorganic material layers 60, including powder of the adsorbent, has pores having a size of 5 through 300 angstroms, thus both of them exhibit the physical adsorption function for gaseous organic impurities.

The protection efficiency is examined in the same manner as before with respect to each of the above-mentioned filters. All of the above-mentioned filters are excellent in adsorption of gaseous basic impurities such as $NH_3$. However, with regard to the performance of adsorbing gaseous organic impurities such as DOP and decamethyl cyclopenta siloxane ($D_5$), the filter of the filter A according to the present invention is specially inferior to the others, and filters B through F are excellent in adsorbing such impurities. The reason that the filter A is inferior to the others lies in the inorganic material layer 51 which has no other major effective pore than the air permeable pore having a size of 1000 angstroms or more, thus hardly having the physical adsorption function for gaseous organic impurities. Each of the other filters is provided with the inorganic material layer which includes the pore in the pore diameter range of about 5 to 300 angstroms, which is suitable for adsorbing gaseous organic impurities, thus being able to adsorb such impurities.

Needless to say, the object to be cleaned by the filter of the invention is not limited to air. The filter of the invention is applicable to cleaning other inert gases such as nitrogen gas and argon gas, and capable of creating inert gases suitable for the manufacturing semiconductor devices and LCD's.

Next, the function and effect of the clean room according to the invention will be explained by way of an embodiment according to the invention.

There is prepared the high efficiency air cleaning apparatus 100 relating to the embodiment of the invention as shown in FIG. 9, which is provided with the filter 111 (i.e. the filter as shown in FIG. 6) according to the invention. The filter 111 includes the honeycomb structure, which is provided with the inorganic material layer that is formed by. fixing powder of silica gel impregnated with aluminum sulfate. Therefore, the filter 111 may remove gaseous basic impurities and gaseous organic impurities as well. The filter 111 is arranged to treat the object air circulating at a rate of 5000 $m^3$/min. A gas analyzer for measuring the concentration of $NH_3$ gas is installed in a space 102 of an object air to be cleaned in the clean room 100, and the concentration of $NH_3$ contained in the space 102 is repeatedly measured every one month. Furthermore, the contact angle is measured using a test piece, which is a silicon wafer substrate covered with a silicon dioxide film free from any organic contaminant deposited thereon. The measurement is carried out by leaving the test piece in the space 102 of the clean room 100 and exposing it for a predetermined period of time. More specifically, the contact angle is first measured immediately after rinsing the test piece, and then measured after exposing it to the space 102 for 12 hours, thereby determining increase in the contact angle caused by the 12-hour exposure. This 12-hour exposure and measurement cycle i.e. rinsing→measurement of contact angle→12-hour exposure→measurement of contact angle, is repeated every one month. The contact angle is 3° at the measurement immediately after rinsing the test piece. The quantity of powder of silica gel impregnated with aluminum sulfate as the adsorbent is 500 Kg for dealing with the object air circulating at a rate of 5000 $m^3$/min, in other words, 0.1 Kg at a rate of 1 $m^3$/min.

Next, another measurement is carried out by substituting, for the filter 111, the three kinds of conventional chemical filters, namely, a filter formed by fixing fibrous activated charcoal to low melting point polyester or polyester non-woven fabric binder in a felt form, a filter formed by fixing activated charcoal particles to the supporter made of the air permeable urethane foam using a proper adhesive, and a filter formed by fixing ion-exchange fiber to low melting point polyester or polyester non-woven fabric binder in a felt form. The measurement is carried out in the same manner as mentioned above. That is, the concentration of $NH_3$ gases contained in the clean room air is repeatedly measured every one month.

The contact angle is measured using a test piece, a silicon wafer substrate covered with the silicon dioxide film free from any organic contaminant deposited thereon. The measurement is first carried out immediately after rinsing the test piece and then after exposing it for 12 hours, thereby determining increase in the contact angle caused by the 12-hour exposure. This 12-hour exposure and measurement cycle i.e. rinsing—measurement of contact angle—12-hour exposure—measurement of contact angle, is repeated every one month. The quantity of each adsorbent i.e. fibrous activated charcoal, activated charcoal particles, and ion exchange fiber, is made equal to that in the previously-described embodiment according to the present invention i.e. 0.1 Kg at an air flow rate of 1 $m^3$/min.

Furthermore, the concentration of $NH_3$ gas and the contact angle are measured with regard to the clean room provided with neither the filter 111 nor the conventional chemical filter described above.

The concentration of $NH_3$ gas is in the range of 5 to 10 ppb in the clean room which is provided with neither the filter 111 nor the conventional chemical filter. On the other hand, the concentration of $NH_3$ gas is maintained in the range of 0.5 to 1.0 ppb in the clean room provided with either the filter 111 or the conventional chemical filter for about a year. The concentration of $NH_3$ gas exceeded 1.0 ppb after one year, due to the deterioration of the adsorption function of the filter.

To comparatively study the change with the passage of time with regard to the contact angle,. the test piece is exposed to the air circulating through three kinds of clean rooms as described above, namely the first one being provided with the air filter 111 according to the present invention, the second one being provided with the prior art chemical filter, and the third one being provided with neither the filter 111 nor the prior art chemical filter. The test is carried out according to the above-mentioned 12-hour exposure and measurement cycle.

After 12-hour exposure of the test piece to the air circulating through the clean room provided with the filter 111 of the invention, the contact angle is changed to 4° from the initial contact angle of 3°, the value obtained immediately after rinsing the test piece. The contact angle is increased by 1° in terms of the net value. It is to be noted that the measurement value of the contact angle measured every one month for one year after initiating the operation of the filter 111 is maintained at about 4° with no significant changes. After the passage of one year, the contact angle begins to increase due to the decrease in the adsorption function of the filter.

On the other hand, after 12-hour exposure of the test piece to the air circulating through the clean room provided with the conventional chemical filter, the contact angle is increased by 10° from the initial contact angle. This result shows that the conventional chemical filters for removing inorganic gaseous impurities not only lacks the capacity to remove organic gaseous impurities, but also desorbs organic gaseous impurities to the air already filtered, for these filters are composed of such members as filter media (such as non-woven fabric and binder), adhesive for fixing activated charcoal to the sheet (such as neoprene resin, urethane resin, epoxy resin, silicone resin), and sealing materials for securing the filter media to the frame (such as neoprene rubber, silicone rubber), all of which desorb organic gaseous impurities to the air, causing the increase of the angle by 10°. It is to be noted that the measurement value of the contact angle measured every one month for one year after starting of the prior art chemical filter has been about 10° with no significant change. After one year, the contact angle began to increase due to the deterioration of the adsorption function of the filter.

The air filter 111 of the invention, therefore, can remove not only gaseous basic impurities but gaseous organic impurities as well. Furthermore, as briefly mentioned in connection with the method for manufacturing the filter 111, it includes no organic material desorbing gaseous organic impurities. This is the reason that the contact angle is increased only by 1° in terms of the net value on the surface of the wafer left for 12 hours.

After 12-hour exposure of the test piece to the air circulating through the clean room provided with neither the filter 111 nor the conventional chemical filter, the contact angle is changed to 7° from the initial contact angle 3°, the contact angle being increased by 4° in terms of the net value. The increase in the contact angle means that the organic gaseous impurities are not removed.

Summarizing the above, the filter 111 of the invention and the conventional chemical filter have no significant difference as far as the removal function of $NH_3$ gas is concerned. However, the filter 111 of the invention is superior to the conventional chemical filter in such that the filter 111 can remove gaseous basic impurities and gaseous organic impurities at a time, and never acts as the new source of organic impurities. On the other hand, the conventional chemical filter may remove gaseous basic impurities, but can not remove gaseous organic impurities. To make the matter worse, it works as the new contaminant source by itself. Still other advantage of the air cleaning filter of the present invention is that it is nonflammable whereas the conventional chemical filter is flammable.

To comparatively study the performance of a particulate filter, the clean room as shown in FIG. 9 is additionally provided with two kinds of particulate filters, one excluding any material desorbing gaseous organic impurities and the other including at least one material desorbing gaseous organic impurities. Both of particulate filters are installed on the downstream side of the filter 111. Cleanliness of the filtered air circulating through the clean room is evaluated by measuring the change with the passage of time with regard to the contact angle. The test is carried out according to the above-mentioned 12-hour exposure and measurement cycle. After 12-hour exposure of the test piece, which is a silicon wafer substrate covered with silicon dioxide, immediately after washing, with no organic contaminants to the air circulating through the clean room provided with the particulate filter excluding any material desorbing gaseous organic impurities, the contact angle is increased by only 1°, in other words, the increase in the contact angle is quite small.

The reason for this small increase in the contact angle is as follows. As described before, the filter of the invention removes gaseous organic impurities causing the substrate surface contamination and also it never acts as the contaminant source by itself. In addition, the particulate filter arranged on the downstream side of the filter 111, would not desorb any of gaseous organic impurities. On one hand, after 12-hour exposure of the test piece to the air circulating through the clean room provided with the particulate filter including the material desorbing gaseous organic impurities, the contact angle is increased by 3°. It is considered that the 1° in the increase of 3° is caused by gaseous organic impurities that the filter failed to remove, but the remaining 2° is caused by gaseous organic impurities originating from the particulate filter.

Preferred embodiments of the invention has been discussed in connection with a clean room, in which all the processes for manufacturing semiconductor devices or LCD's can be carried out. However, the invention is not limited only such clean room. The invention is, as a matter of course, applicable to the air cleaning apparatus for use in a locally confined space, so-called, mini-environment, for instance a clean bench, a clean chamber, a storage means (stocker) for processing and/or storing clean products, etc. Furthermore, the invention may be modified in compliance with various operational and environmental conditions such as an air volume to be cleaned, a ratio of the intake volume of the outdoor air to the air volume circulating through the clean room, generation of gaseous impurities inside the clean room, and so forth.

For instance, it is now expected that the manufacture of DRAM's of 256-megabyte and/or 1-gigabyte would start in 1999, using a gigantic silicon wafer with a diameter of 300 mm. In the case of the apparatus used for manufacturing such a sophisticated semiconductor device, after introducing and setting the silicon wafer in a chemical reaction chamber of the apparatus, the inert gas such as highly purified nitrogen and argon is often supplied to the chemical reaction chamber from an inert gas source so as to fill it up therewith, before initiating predetermined various chemical reactions with the silicon wafer inside the apparatus. The inert gas itself is so highly purified that there is no possibility of contaminating the surface of the silicon wafer.

In order to control supply of such purified inert gas, however, a valve is provided between the chemical reaction chamber and the inert gas supplying source. Therefore, it is possible that the valve might work as a source of various chemical impurities. Accordingly, if the filter of the invention is provided onto the gas flow path between the valve and the. chemical reaction chamber, it would remove various chemical contaminants which might be generated by the valve, thereby contributing to the prevention of the surface contamination and to improvement of product quality as well.

The present invention has the following effects. In the case of protecting the substrate surface handled in a clean room from contamination, the air filter of the present invention has a capability to adsorb and remove both gaseous basic impurities and gaseous organic impurities contained in the atmosphere which cause the substrate surface contamination, so that highly clean air which is suitable for manufacturing semiconductors and LCDs, and which is free from any gaseous impurities causing substrate surface contamination, can be produced. In addition, by using thus produced air for the atmosphere in the clean room, to which the surface of substrate is exposed, the contamination of the substrate surface is protected.

Furthermore, another advantage is to provide a filter having no flammable substance in its constituents by combining an adsorbent in which a salt of an inorganic acid is impregnated to powder of an inorganic substance selected from at least one of diatom earth, silica, alumina, a mixture of silica and alumina, aluminum silicate, activated alumina, porous glass, activated clay, activated bentonite, or synthetic zeolite as the adsorbent to adsorb and remove gaseous basic impurities, with a properly selected powder from various inorganic substances as the adsorbent to adsorb and remove gaseous organic impurities.

A high efficiency air cleaning apparatus constructed with the filter of the invention is superior in preventing disaster to the high efficiency air cleaning apparatus constructed with the conventional air filter using activated charcoal adsorbent and/or ion exchange fiber. The present invention can provide a filter consisting of material not generating gaseous organic substances which cause the substrate surface contamination. Accordingly, the high efficiency air cleaning apparatus constructed. with the filter of this invention can protect the substrate surface from organic substance contamination more completely than the high efficiency air cleaning apparatus constructed with the conventional filter using activated charcoal adsorbent and/or ion exchange fiber.

Although the main impurities to be removed by the filter of the present invention is gaseous basic impurities, the filer of the present invention is also effective in removing gaseous organic impurities. Thus the filter of the present invention has capability to remove gaseous basic impurities and organic impurities as well, thereby expanding the advantage such as reduction of the volume of the adsorptive layer, reduction of the pressure loss, reduction of manufacturing cost of the adsorptive layer and so forth.

What is claimed is:

1. An air filter comprising an inorganic material layer formed by fixing an adsorbent to a surface of a supporter, using an inorganic binder powder, wherein said adsorbent is prepared by impregnating a salt of an inorganic acid to an inorganic powder comprising an inorganic substance selected from the group consisting of diatom earth, silica, alumina, a mixture of silica and alumina, aluminum silicate, activated alumina, porous glass, activated clay, activated bentonite, and synthetic zeolite.

2. An air filter comprising an inorganic material layer that is formed by fixing an adsorbent to a surface of a supporter, using a powder of an inorganic substance α as a binder or a filler, wherein said adsorbent is prepared by impregnating a salt of an inorganic acid to an inorganic powder comprising an inorganic substance selected from the group consisting of diatom earth, silica, alumina, a mixture of silica and alumina, aluminum silicate, activated alumina, porous glass, activated clay, activated bentonite, and synthetic zeolite; and the inorganic substance α is selected from the group consisting of talc, kaolin mineral, bentonite, diatom earth, silica, alumina, a mixture of silica and alumina, aluminum silicate, activated alumina, porous glass, hydrated magnesium silicate clay mineral having a crystal structure of the ribbon type, activated clay, activated bentonite and synthetic zeolite.

3. An air filter comprising a first inorganic material layer and a second inorganic material layer and a supporter, wherein either the first inorganic material layer or the second inorganic material layer is directly fixed to a surface of the supporter and the first inorganic material layer is fixed to a surface of the second inorganic material layer so that the first inorganic material layer and the second inorganic material layer are stacked on the surface of the supporter, wherein said first inorganic material layer is a layer formed of an adsorbent which is made by impregnating a salt of an inorganic acid to an inorganic powder comprising an inorganic substance selected from the group consisting of diatom earth, silica, alumina, a mixture of silica and alumina, aluminum silicate, activated alumina, porous glass, activated clay, activated bentonite, and synthetic zeolite, and an inorganic binder powder; and said second inorganic substance layer is a layer comprising an inorganic substance selected from the group consisting of diatom earth, silica, alumina, a mixture of silica and alumina, aluminum silicate, activated alumina, porous glass, hydrated magnesium silicate clay mineral having a crystal structure of the ribbon type, activated clay, activated bentonite and synthetic zeolite.

4. An air filter comprising a supporter and a layer formed of a plurality of pellets fixed to a surface of the supporter, wherein each pellet is formed by pelletizing an adsorbent using a powder of an inorganic substance α as a binder or a filler, wherein said inorganic substance α is selected from the group consisting of talc, kaolin mineral, bentonite, diatom earth, silica, alumina, a mixture of silica and alumina, aluminum silicate, activated alumina, porous glass, hydrated magnesium silicate clay mineral having a crystal structure of the ribbon type, activated clay, activated bentonite and synthetic zeolite; and said adsorbent is prepared by impregnating a salt of an inorganic acid to an inorganic powder comprising an inorganic substance selected from the group consisting of diatom earth, silica, alumina, a mixture of silica and alumina, aluminum silicate, activated alumina, porous glass, activated clay, activated bentonite, and synthetic zeolite.

5. An air filter comprising a supporter, a first pellet and a second pellet, wherein said second pellet is formed by coating the first pellet with a powder of an inorganic substance β, and said second pellet is fixed on a surface of said supporter; wherein said first pellet is prepared by using an inorganic binder powder to pelletize an adsorbent made by impregnating a salt of an inorganic acid to an inorganic powder comprising an inorganic substance selected from the group consisting of diatom earth, silica, alumina, a mixture of silica and alumina, aluminum silicate, activated alumina, porous glass, activated clay, activated bentonite, and synthetic zeolite; and said inorganic substance β is selected from the group consisting of diatom earth, silica, alumina, a mixture of silica and alumina, aluminum silicate, activated alumina, porous glass, hydrated magnesium silicate clay mineral having a crystal structure of the ribbon type, activated clay, activated bentonite and synthetic zeolite.

6. An air filter, comprising a casing containing a plurality of pellets, wherein each pellet is either formed by pelletizing an adsorbent using a powder of an inorganic substance α as a binder or a filler, or formed by pelletizing the adsorbent using an inorganic binder powder and coating with powder of an inorganic substance β; wherein said inorganic substance α is selected from the group consisting of talc, kaolin mineral, bentonite, diatom earth, silica, alumina, a mixture of silica and alumina, aluminum silicate, activated alumina, porous glass, hydrated magnesium silicate clay mineral having a crystal structure of the ribbon type, activated clay, activated bentonite and synthetic zeolite; said adsorbent is prepared by impregnating salt of an inorganic acid to an inorganic powder comprising an inorganic substance selected from the group consisting of diatom earth, silica, alumina, a mixture of silica and alumina, aluminum silicate, activated alumnina, porous glass, activated clay, activated bentonite, and synthetic zeolite; and said inorganic substance β is selected from the group consisting of diatom earth, silica, alumina, a mixture of silica and alumina, aluminum silicate, activated alumina, porous glass, hydrated magnesium silicate clay mineral having a crystal structure of the ribbon type, activated clay, activated bentonite and synthetic zeolite.

7. The air filter according to claim 1, 2, 3, 4, 5 or 6, wherein said inorganic substance powder impregnated with salt of inorganic acid has an average pore diameter of 100 angstroms or more.

8. The air filter according to claim 1, 2, 3, 4, 5 or 6, wherein said salt of the inorganic acid is sulfate.

9. The air filter according to claim 1, 2, 3, 4, or 5, wherein said supporter has a honeycomb structure.

10. The air filter according to claim 9, wherein said honeycomb structure consists of inorganic fiber as an essential component.

11. A method for manufacturing an air filter comprising the steps of:
   immersing a supporter in a suspension in which an adsorbent and a powder of an inorganic substance α are dispersed; and then
   drying said supporter, thereby forming an inorganic material layer fixed to the surface of the supporter:
      wherein said adsorbent is prepared by impregnating a salt of an inorganic acid to an inorganic powder comprising an inorganic substance selected from the group consisting of diatom earth, silica, alumina, a mixture of silica and alumina, aluminum silicate, activated alumina, porous glass, activated clay, activated bentonite, and synthetic zeolite; and said inorganic substance α is selected from the group consisting of talc, kaolin mineral, bentonite, diatom earth, silica, alumina, a mixture of silica and alumina, aluminum silicate, activated alumina, porous glass, hydrated magnesium silicate clay mineral having a crystal structure of the ribbon type, activated clay, activated bentonite and synthetic zeolite.

12. A method for manufacturing an air filter comprising the steps of:
   immersing a supporter in a first suspension;
   then drying said supporter, thereby forming a first inorganic material layer on the surface of the supporter;
   immersing the supporter on which said first inorganic material layer is formed in a second suspension; and then
   drying said supporter, thereby forming a second inorganic material layer on the surface of the first inorganic material layer, wherein the first suspension contains an adsorbent and an inorganic binder powder and the second suspension contains an inorganic substance β or wherein the first suspension contains the inorganic substance β and the second suspension contains the adsorbent and the inorganic binder powder,
      and wherein said adsorbent is prepared by impregnating a salt of an inorganic acid to an inorganic powder comprising an inorganic substance selected from the group consisting of diatom earth, silica, alumina, a mixture of silica and alumina, aluminum silicate, activated alumina, porous glass, activated clay, activated bentonite, and synthetic zeolite; and said inorganic substance β is selected from the group consisting of diatom earth, silica, alumina, a mixture of silica and alumina, aluminum silicate, activated alumina, porous glass, hydrated magnesium silicate clay mineral having a crystal structure of the ribbon type, activated clay, activated bentonite and synthetic zeolite.

13. The method for manufacturing the air filter according to claim 11, further comprising a step of:
   dissolving the salt of the inorganic acid in advance into the suspension separately before immersing the supporter.

14. The method for manufacturing the air filter according to claim 12, further comprising a step of:
   dissolving the salt of the inorganic acid in advance into the suspension before immersing the supporter.

15. A method for manufacturing an air filter comprising the steps of
   preparing an adsorbent by impregnating a salt of an inorganic acid to a powder of an inorganic substance γ;
   then immersing a supporter in a suspension in which a powder of said adsorbent and a powder of an inorganic substance α as a binder are mixed together; and
   removing the supporter from said suspension for drying after immersion,
      wherein said inorganic substance γ is selected from the group consisting of diatom earth, silica, alumina, a mixture of silica and alumina, aluminum silicate, activated alumina, porous glass, activated clay, activated bentonite and synthetic zeolite; and said inorganic substance α is selected from the group consisting of talc, kaolin mineral, bentonite, diatom earth, silica, alumina, a mixture of silica and alumina, aluminum silicate, activated alumina, porous glass, hydrated magnesium silicate clay mineral having a crystal structure of the ribbon type, activated clay, activated bentonite and synthetic zeolite.

16. The method for manufacturing the air filter according to claim 15, further comprising a step of: dissolving the salt of the inorganic acid separately into said suspension.

17. A method for manufacturing an air filter comprising the steps of:
   immersing a supporter in a suspension in which a powder of an inorganic substance γ and an inorganic binder substance α are mixed together;
   removing the supporter from said suspension for drying after immersion in said suspension;
   immersing said dried supporter in a salt solution of an inorganic acid; and
   removing the supporter from said solution for drying after immersion in said solution,
      wherein said inorganic substance γ is selected from the group consisting of diatom earth, silica, alumina, a mixture of silica and alumina, aluminum silicate, activated alumina, porous glass, activated clay, activated bentonite and synthetic zeolite; and said inorganic binder substance α is selected from the group consisting of talc, kaolin mineral, bentonite, diatom earth, silica, alumina, a mixture of silica and alumina, aluminum silicate, activated alumina, porous glass, hydrated magnesium silicate clay mineral having a crystal structure of the ribbon type, activated clay, activated bentonite and synthetic zeolite.

18. A method for manufacturing an air filter comprising the steps of immersing a supporter in a suspension in which a powder of an inorganic substance γ and an inorganic binder substance α are mixed in a salt solution of an inorganic acid, and
   removing the supporter from said suspension for drying after immersion in said suspension, wherein said inorganic substance γ is selected from the group consisting of diatom earth, silica, alumina, a mixture of silica and alumina, aluminum silicate, activated alumina, porous glass, activated clay, activated bentonite and synthetic zeolite; and said inorganic substance α is selected from the group consisting of talc, kaolin mineral, bentonite, diatom earth, silica, alumina, a mixture of silica and alumina, aluminum silicate, activated alumina, porous glass, hydrated magnesium silicate clay mineral having a crystal structure of the ribbon type, activated clay, activated bentonite and synthetic zeolite.

19. The method for manufacturing the air filter according to claim 12, 13, 14, 15, 16, 17 or 18, wherein said salt of the inorganic acid is sulfate.

20. A high efficiency air cleaning apparatus comprising:

an air circulating path;

an air filter disposed in said air circulating path; and a particulate filter, arranged on the downstream side of said air filter in said air circulating path, wherein said air filter includes an inorganic material layer comprising an adsorbent connected to a surface of a supporter and an inorganic binder powder; and said adsorbent is prepared by impregnating a salt of an inorganic acid to an inorganic powder comprising an inorganic substance selected from the group consisting of diatom earth, silica, alumina, a mixture of silica and alumina, aluminum silicate, activated alumina, porous glass, activated clay, activated bentonite, and synthetic zeolite.

21. The high efficiency air cleaning apparatus according to claim 20, wherein the inorganic material layer is directly fixed on the surface of the supporter using the inorganic binder powder, and wherein the inorganic binder powder comprises an inorganic substance α selected from the group consisting of talc, kaolin mineral, bentonite, diatom earth, silica, alumina, a mixture of silica and alumina, aluminum silicate, activated alumina, porous glass, hydrated magnesium silicate clay mineral having a crystal structure of the ribbon type, activated clay, activated bentonite and synthetic zeolite.

22. The high efficiency air cleaning apparatus according to claim 20, wherein said inorganic material layer is a first inorganic material layer and the claimed air cleaning apparatus further comprises a second inorganic material layer, wherein either one of the first inorganic material layer or the second inorganic material layer is directly fixed to the surface of the supporter and the first inorganic material layer is directly fixed to the surface of the second inorganic material layer so that the first inorganic material layer and the second inorganic layer are stacked on the surface of the supporter; and said second inorganic substance layer is a layer comprising an inorganic substance selected from the group consisting of diatom earth, silica, alumina, a mixture of silica and alumina, aluminum silicate, activated alumina, porous glass, hydrated magnesium silicate clay mineral having a crystal structure of the ribbon type, activated clay, activated bentonite and synthetic zeolite.

23. The high efficiency air cleaning apparatus according to claim 20, wherein said inorganic material layer is formed from pellets of the adsorbent that are fixed on the surface of the supporter using the inorganic binder powder, which is selected from the group consisting of talc, kaolin mineral, bentonite, diatom earth, silica, alumina, a mixture of silica and alumina, aluminum silicate, activated alumina, porous glass, hydrated magnesium silicate clay mineral having a crystal structure of the ribbon type, activated clay, activated bentonite and synthetic zeolite.

24. The high efficiency air cleaning apparatus according to claim 20, wherein said inorganic material layer is formed from one or more second pellets, each of which is formed by coating a first pellet with an inorganic substance β, and said inorganic material layer is directly fixed on the surface of the supporter; wherein said first pellet is made by pelletizing the adsorbent; and said inorganic substance β is selected from the group consisting of diatom earth, silica, alumina, a mixture of silica and alumina, aluminum silicate, activated alumina, porous glass, hydrated magnesium silicate clay mineral having a crystal structure of the ribbon type, activated clay, activated bentonite and synthetic zeolite.

25. A high efficiency air cleaning apparatus comprising the air filter according to claim 6, and further comprising an air circulating path and a particulate filter, wherein the air filter is disposed in the air circulating path and the particulate filter is arranged on the downstream side of the air filter in the air circulating path.

26. The high efficiency air cleaning apparatus according to claim 20, 21, 22, 23, 24 or 25, wherein said air filter and said particulate filter are installed on a ceiling portion of a space where clean atmosphere is required.

* * * * *